(12) United States Patent
Grocutt

(10) Patent No.: US 11,727,110 B2
(45) Date of Patent: Aug. 15, 2023

(54) VERIFYING STACK POINTER

(71) Applicant: Arm Limited, Cambridge (GB)

(72) Inventor: Thomas Christopher Grocutt, Cambridge (GB)

(73) Assignee: Arm Limited, Cambridge (GB)

( * ) Notice: Subject to any disclaimer, the term of this patent is extended or adjusted under 35 U.S.C. 154(b) by 332 days.

(21) Appl. No.: 17/269,205

(22) PCT Filed: Sep. 3, 2019

(86) PCT No.: PCT/GB2019/052449
§ 371 (c)(1),
(2) Date: Feb. 17, 2021

(87) PCT Pub. No.: WO2020/074854
PCT Pub. Date: Apr. 16, 2020

(65) Prior Publication Data
US 2021/0224380 A1 Jul. 22, 2021

(30) Foreign Application Priority Data

Oct. 8, 2018 (GB) .................................... 1816354
Nov. 23, 2018 (GB) .................................... 1819123

(51) Int. Cl.
*G06F 21/54* (2013.01)
*G06F 9/30* (2018.01)
(Continued)

(52) U.S. Cl.
CPC .......... *G06F 21/54* (2013.01); *G06F 9/30101* (2013.01); *G06F 9/3861* (2013.01);
(Continued)

(58) Field of Classification Search
CPC .... G06F 21/54; G06F 9/30101; G06F 9/3861; G06F 21/554; G06F 21/556; G06F 21/64; G06F 21/74
See application file for complete search history.

(56) References Cited

U.S. PATENT DOCUMENTS

| 6,363,473 B1 | 3/2002 | Volentine et al. |
| 2004/0170046 A1* | 9/2004 | Belnet ..................... G06F 21/74 |
| | | 711/E12.093 |

(Continued)

FOREIGN PATENT DOCUMENTS

| GB | 2515047 | 12/2014 |
| GB | 2527643 | 12/2015 |

(Continued)

OTHER PUBLICATIONS

Office Action for IN Application No. 202117014393 dated Dec. 21, 2022, 6 pages.

(Continued)

*Primary Examiner* — Ayoub Alata
(74) *Attorney, Agent, or Firm* — Nixon & Vanderhye P.C.

(57) ABSTRACT

An apparatus comprises: processing circuitry to perform data processing in one of a plurality of security domains including at least a secure domain and a less secure domain, and memory access checking circuitry to check whether a memory access is allowed depending on security attribute data indicating which domain is associated with a target address. In response to a given change of program flow from processing in the less secure domain to a target instruction having an address associated with the secure domain: a fault is triggered when the target instruction is an instruction other than a gateway instruction indicating a valid entry point to the secure domain. When the target instruction is said gateway instruction, a stack pointer verifying action is (Continued)

triggered to verify whether it is safe to use a selected stack pointer stored in a selected stack pointer register.

21 Claims, 9 Drawing Sheets

(51) Int. Cl.
  *G06F 9/38* (2018.01)
  *G06F 21/55* (2013.01)
  *G06F 21/64* (2013.01)
  *G06F 21/74* (2013.01)

(52) U.S. Cl.
  CPC .......... *G06F 21/554* (2013.01); *G06F 21/556* (2013.01); *G06F 21/64* (2013.01); *G06F 21/74* (2013.01)

(56) References Cited

U.S. PATENT DOCUMENTS

| | | | | |
|---|---|---|---|---|
| 2007/0283146 A1* | 12/2007 | Neveux | ................... | G06F 21/74 713/189 |
| 2013/0205125 A1* | 8/2013 | Grocutt | ................. | G06F 9/4812 712/244 |
| 2013/0205413 A1 | 8/2013 | Grocutt et al. | | |
| 2014/0075581 A1* | 3/2014 | Grocutt | ................. | G06F 21/554 726/30 |
| 2014/0373171 A1* | 12/2014 | Grocutt | ................... | G06F 21/74 726/27 |

FOREIGN PATENT DOCUMENTS

| | | |
|---|---|---|
| TW | 201415287 | 4/2014 |
| TW | 201447754 | 12/2014 |

OTHER PUBLICATIONS

Search Report and Office Action for TW Application No. 108134526 dated Nov. 16, 2022, 4 pages.

Robert Bedichek, "Some Efficient Architecture Simulation Techniques," Proceedings of the Winter 1990 USENIX Conference, Jan. 22-26, 1990, 12 pages.

Search Report for GB Application No. 1819123.9 dated May 3, 2019, 4 pages.

International Search Report and Written Opinion of the ISA for PCT/GB2019/052449 dated Oct. 28, 2019, 18 pages.

* cited by examiner

Exception entry

| | background stack | background security domain | background mode | exception target security domain | stack frame format |
|---|---|---|---|---|---|
| 1 | Main stack pointer | Secure | Thread | Secure | caller regs and possibly callee regs |
| 2 | Main stack pointer | Secure | Thread | less-secure | caller and callee saved regs |
| 3 | Main stack pointer | Secure | Handler | Secure | caller regs and possibly callee regs |
| 4 | Main stack pointer | Secure | Handler | less-secure | caller and callee saved regs |
| 5 | Main stack pointer | less-secure | Thread | Secure | caller saved regs only |
| 6 | Main stack pointer | less-secure | Thread | less-secure | caller saved regs only |
| 7 | Main stack pointer | less-secure | Handler | Secure | caller saved regs only |
| 8 | Main stack pointer | less-secure | Handler | less-secure | caller saved regs only |
| 9 | Process stack pointer | Secure | Thread | Secure | caller regs and possibly callee regs |
| 10 | Process stack pointer | Secure | Thread | less-secure | caller and callee saved regs |
| 11 | Process stack pointer | less-secure | Thread | Secure | caller saved regs only |
| 12 | Process stack pointer | less-secure | Thread | less-secure | caller saved regs only |

FIG. 6

Exception return

| | Security domain associated with exception | Security domain when exception return requested | Stack pointer being returned to | mode being returned to | security domain being returned to | Callee regs expected & integrity signature checked |
|---|---|---|---|---|---|---|
| 1 | Secure | Secure | Main stack pointer | Thread | Secure | depends on EXC_RETURN.DCRS flag |
| 2 | Secure | Secure | Main stack pointer | Thread | less-secure | no |
| 3 | Secure | Secure | Main stack pointer | Handler | Secure | depends on EXC_RETURN.DCRS flag |
| 4 | Secure | Secure | Main stack pointer | Handler | less-secure | no |
| 5 | Secure | Secure | Process stack pointer | Thread | Secure | depends on EXC_RETURN.DCRS flag |
| 6 | Secure | Secure | Process stack pointer | Thread | less-secure | no |
| 7 | less-secure | Secure | Main stack pointer | Thread | Secure | yes |
| 8 | less-secure | Secure | Main stack pointer | Thread | less-secure | no |
| 9 | less-secure | Secure | Main stack pointer | Handler | Secure | yes |
| 10 | less-secure | Secure | Main stack pointer | Handler | less-secure | no |
| 11 | less-secure | Secure | Process stack pointer | Thread | Secure | yes |
| 12 | less-secure | Secure | Process stack pointer | Thread | less-secure | no |
| 13 | less-secure | less-secure | Main stack pointer | Thread | Secure | yes |
| 14 | less-secure | less-secure | Main stack pointer | Thread | less-secure | no |
| 15 | less-secure | less-secure | Main stack pointer | Handler | Secure | yes |
| 16 | less-secure | less-secure | Main stack pointer | Handler | less-secure | no |
| 17 | less-secure | less-secure | Process stack pointer | Thread | Secure | yes |
| 18 | less-secure | less-secure | Process stack pointer | Thread | less-secure | no |

FIG. 7

VERIFYING STACK POINTER

This application is the U.S. national phase of International Application No. PCT/GB2019/052449 filed Sep. 3, 2019 which designated the U.S. and claims priority to GB Patent Application Nos. 1816354.3 filed Oct. 8, 2018, and 1819123.9 filed Nov. 23, 2018, the entire contents of each of which are hereby incorporated by reference.

The present technique relates to the field of data processing.

Processing circuitry may support performing data processing in one of a number of security domains, including at least a secure domain and a less secure domain. This can allow sensitive data or code associated with the secure domain to be protected from inappropriate access by less secure code operating in the less secure domain.

At least some examples provide an apparatus comprising: processing circuitry to perform data processing in one of a plurality of security domains including at least a secure domain and a less secure domain; memory access checking circuitry to check whether a memory access is allowed depending on security attribute data indicative of which of the plurality of security domains is associated with a target address of the memory access; and at least one stack pointer register to store a stack pointer indicative of a stack data structure in memory; in which: in response to a given change of program flow from processing in the less secure domain to a target instruction having an instruction address associated with the secure domain: when the target instruction is an instruction other than a gateway instruction indicative of a valid entry point to the secure domain, the processing circuitry configured to trigger a fault; and when the target instruction is said gateway instruction, the processing circuitry is configured to trigger a stack pointer verifying action to verify whether it is safe to use a selected stack pointer stored in a selected stack pointer register.

At least some examples provide a data processing method for processing circuitry capable of performing data processing in one of a plurality of security domains including at least a secure domain and a less secure domain, for which checking of whether a memory access is allowed is dependent on security attribute data indicative of which of the plurality of security domains is associated with a target address of the memory access; the method comprising, in response to a given change of program flow from processing in the less secure domain to a target instruction having an instruction address associated with the secure domain: determining whether the target instruction is a gateway instruction indicative of a valid entry point to the secure domain; when the target instruction is an instruction other than said gateway instruction, triggering a fault; and when the target instruction is said gateway instruction, triggering a stack pointer verifying action to verify whether it is safe to use a selected stack pointer stored in a selected stack pointer register.

At least some examples provide a computer program for controlling a host data processing apparatus to provide an instruction execution environment for execution of instructions; the computer program comprising: processing program logic to support data processing in one of a plurality of security domains including at least a secure domain and a less secure domain; memory access checking program logic to check whether a memory access is allowed depending on security attribute data indicative of which of the plurality of security domains is associated with a target address of the memory access; and register emulating program logic to control access to a memory of the host data processing apparatus to simulate accesses to simulated architectural registers of a target architecture simulated by the computer program, said simulated architectural registers comprising at least one stack pointer register for storing a stack pointer indicative of a stack data structure in memory; in which: in response to a given change of program flow from processing in the less secure domain to a target instruction having an instruction address associated with the secure domain: when the target instruction is an instruction other than a gateway instruction indicative of a valid entry point to the secure domain, the processing program logic is configured to trigger a fault; and when the target instruction is said gateway instruction, the processing program logic is configured to trigger a stack pointer verifying action to verify whether it is safe to use a selected stack pointer associated with a selected stack pointer register of said simulated architectural registers.

A computer-readable storage medium may store the computer program described above. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing system having processing circuitry supporting secure and less secure domains;

FIG. 6 is a table illustrating different exception entry transitions supported by the data processing apparatus;

FIG. 7 is a table showing a number of different exception return transitions supported by the data processing apparatus;

Figure 1:
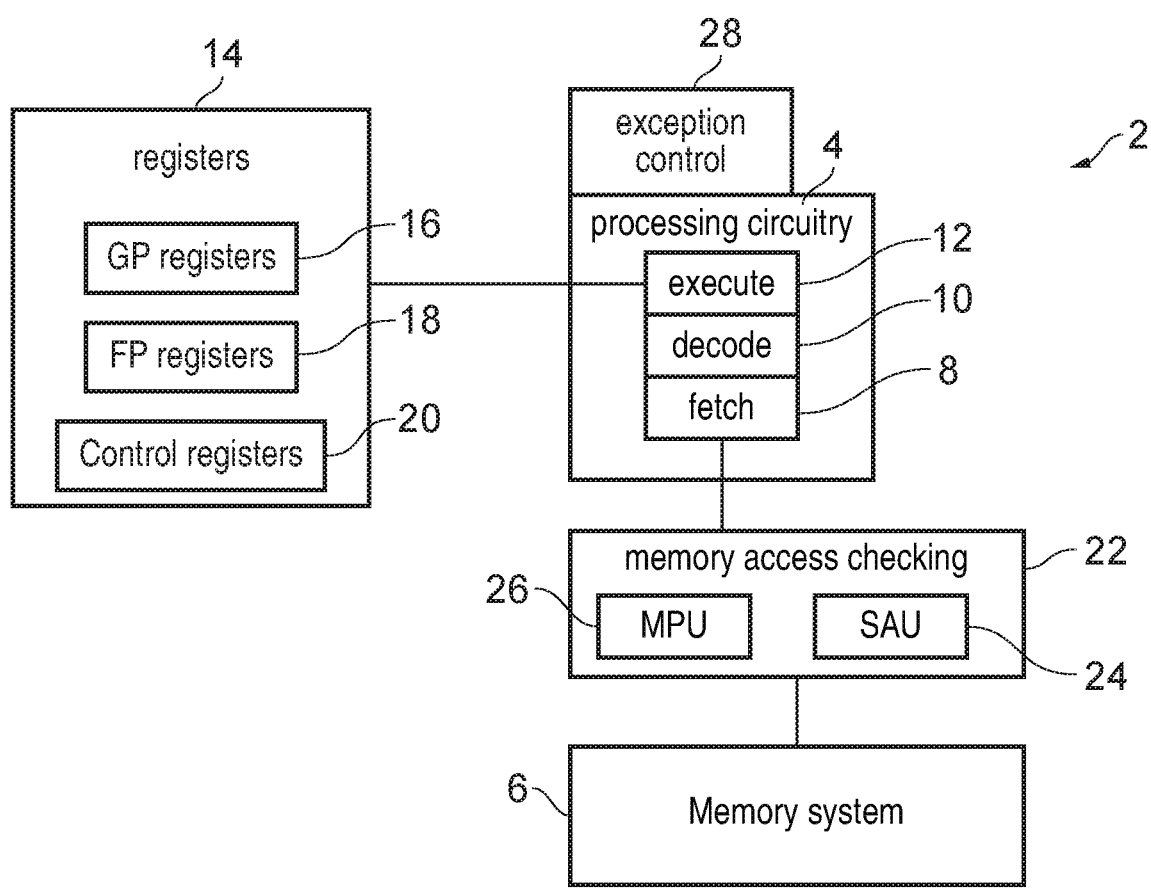

A data processing apparatus may have processing circuitry which supports data processing in one of a number of security domains including at least a secure domain and a less secure domain. Memory access checking circuitry may be provided to check whether a memory access is allowed depending on security attribute data indicative of which of the domains is associated with a target address of the memory access. For example, when operating in the less secure domain the memory access checking circuitry may prevent memory accesses to an address associated with the secure domain, while when operating in the secure domain the processing circuitry may be allowed to access addresses associated with both the secure domain and the less secure domain. At least one stack pointer register may be provided to store a stack pointer indicative of a stack data structure in memory. For example the stack data structure could be used for saving and restoring architectural state when handling exceptions.

In the techniques discussed below, in response to a given change of program flow from processing in the less secure domain to a target instruction having an instruction address associated with the secure domain: when the target instruction is an instruction other than a gateway instruction indicative of a valid entry point to the secure domain, the processing circuitry triggers a fault; and when the target instruction is the gateway instruction, the processing circuitry triggers a stack pointer verifying action to verify whether it is safe to use a selected stack pointer stored in a selected stack pointer register.

The gateway instruction may be used to mark valid entry points to the secure domain. By triggering a fault if, following a change of program flow from the less secure domain to a target instruction having an instruction address associated with the secure domain, the target instruction is not a gateway instruction, this prevents an attacker who has control of code processed in the less secure domain breaching security by triggering a branch to an arbitrary point within secure code stored in secure regions of memory. The given change of program flow which triggers the check of whether the target instruction is the gateway instruction may be either a sequential change of program flow (where execution of a sequence of instructions without branches crosses a boundary between addresses designated as less secure and designated as secure, without a branch) or a non-sequential change of program flow (e.g. caused by a branch or other instruction, or caused by an exception entry or return event, which causes an update of the program counter indicating the instruction address representing the current point of execution).

On the other hand, following the given change of program flow, when the target instruction is the gateway instruction, the processing circuitry may trigger a stack pointer verifying action to verify whether it is safe to use a selected stack pointer stored in a selected stack pointer register. This may protect against certain attacks which may attempt to manipulate the stack pointer used within the secure domain in an attempt to allow non-secure code operating in the less secure domain to have influence over which instructions are executed in the secure domain. By triggering the stack pointer verifying action in response to the gateway instruction, this can ensure that the stack pointer verifying action is triggered each time the secure domain is entered from the less secure domain. As a fault will be raised following the given change of program flow if the next instruction executed is any instruction other than a gateway instruction, this means that the gateway instruction can be trusted to implement extra security checks even if the rest of the code to be executed in the secure domain following the gateway instruction is malicious code that has been called by an attacker. Hence, the gateway instruction can trigger an action to verify whether the selected stack pointer is safe to use, to protect against attacks which attempt to misuse the stack pointer. Triggering the stack pointer verifying action in response to the gateway instruction, rather than based on logic not directly triggered by an instruction which monitors for certain security domain transitions, can also be simpler to implement in micro-architecture for the hardware system designer.

In some examples, the apparatus may comprise two or more stack pointer registers to store respective stack pointers. Which stack pointer register is accessed when a stack access is needed may depend on the current security domain and/or a current mode of operation of the processing circuitry, and also in some cases based on architectural state stored in a control register for example.

For example, in some cases the system may comprise at least two stack pointer registers including a secure stack pointer register accessible in the secure domain and a less secure stack pointer register accessible in both the secure domain and the less secure domain. Which stack pointer register is used to provide the stack pointer for saving/restoring architectural state when handling exceptions may be selected depending on the domains involved in the exception entry or exception return transition. By providing separate secure and less secure stack pointer registers this can prevent less secure code being able to identify or modify which region of memory contains the stack structure used by the secure domain. Hence in some cases the selected stack pointer register may be the secure stack pointer register.

More specifically, some examples may have processing circuitry which, within a given security domain, supports processing in one of a plurality of modes. The modes may include a handler mode for exception processing and a thread mode for background processing. Separation of thread and handling modes can be useful to simplify management of which architectural state is accessible to the processing circuitry, which can simplify exception processing and ensure that certain state required for exception handling is not made available to background processing in the thread mode for example. Hence control over access to regions of memory and of which architectural registers are accessible to processing circuitry may be based on a combination of the current security domain and the current mode of the processing circuitry, and in some cases also based on other control parameters of the architecture.

In systems which support thread and handler modes, then the stack pointer registers may include a process stack pointer register for storing a process stack pointer and a main stack pointer register for storing a main stack pointer. There may be secure and less secure banked versions of the process and main stack pointer registers, so in some cases there may be at least four different stack pointer registers (secure main stack pointer, secure process stack pointer, less secure main stack pointer and less secure process stack pointer). In general, the main stack pointer register may be selected when operating in the handler mode. When in the thread mode, one of the process stack pointer register and the main stack pointer register may be selected based on a stack pointer selection value stored in a control register. In an architecture providing banked stack pointer registers, including the four stack pointer registers described above, the selected stack pointer register for which the stack pointer verifying action is performed in response to the gateway instruction may be the secure main stack pointer register or the secure process stack pointer register.

The stack pointer verifying action can be performed in different ways. In one example the stack pointer verifying action may comprise triggering a permissions check to check whether a load request, which requests loading of a value from a target address derived from the selected stack pointer stored in the selected stack pointer register, would be permitted. In some implementations, this permissions check could be triggered by issuing an actual load request to the target address. Alternatively, a permissions check could be triggered by issuing another type of memory access request, such as a store request, or by issuing a permissions checking request specifying the target address, which does not actually trigger an access to memory but controls the memory access checking circuitry to return an indication of whether an access to the target address would be permitted.

It may seem counter-intuitive that it would be useful to trigger memory permissions checking for an address derived from a stack pointer when a gateway instruction is encountered, as the functionality of the gateway instruction in marking a valid entry point to the secure domain would not appear to require any value to be accessed in memory. However, by triggering a permissions check for the target address derived from the selected stack pointer stored in the selected stack pointer register, the permissions check can serve as a check of whether the selected stack pointer would be safe to use. For example the processing circuitry may be configured to operate at one of a number of privilege levels. The memory access checking circuitry could trigger a fault if a selected set of access permissions applicable to the target address triggered in response to the gateway instruction specifies that a selected privilege level is prohibited from accessing the target address. Hence, the gateway instruction may be used to invoke privilege-based memory permission checks implemented by the memory access checking circuitry, to provide a way of verifying whether the selected stack pointer is safe.

In particular, the selected privilege level may be the privilege level that is associated with processing in a combination of the secure domain and a current mode of operation of the processing circuitry at the time of the given change of program flow. For example if the combination of the secure domain and the current mode is defined as unprivileged, then the memory access checking circuitry may check whether the selected set of access permissions indicate that the target address derived from the selected stack pointer would be allowed to be executed by unprivileged code, and if unprivileged code is not allowed to access that address a fault may be triggered. This may protect against attacks where an attacker may attempt to use unprivileged code to manipulate a stack pointer which points to a stack data structure in privileged regions of memory.

The selected set of access permissions, which are used to check whether the target address derived from the selected stack pointer would be allowed to be accessed in response to a load request, may comprise a set of access permissions which are applicable to the target address when a current domain of the processing circuitry is the secure domain. In some examples the memory access checking circuitry may maintain separate sets of access permission data for the secure and less secure domains respectively. Hence, even if the gateway instruction is executed at a time when the current domain is still the less secure domain (although the gateway instruction is stored in a secure region of memory, the domain switch may not yet have been triggered), the gateway instruction may trigger permissions checking using access permissions associated with the secure domain, to provide a verification of whether a stack pointer which could later be accessed from the secure domain is safe to use.

In some examples the target address which is checked in the permissions check triggered by the gateway instruction could be derived from the selected stack pointer by adding a certain offset to the selected stack pointer. In other examples the target address may simply equal the selected stack pointer itself.

In one example, the processing circuitry may also perform re-entrancy checking in response to the gateway instruction. The re-entrancy checking may comprise triggering a fault when a value loaded from the target address derived from the selected stack pointer is one of at least one integrity signature value. The integrity signature value may be a predetermined pattern of bits which may be used to enable some integrity checks on a stack data structure in memory. In some implementations, there may be support for two or more different integrity signature values (e.g. one used for exception stack frames and another used for function stack frames). In this case, the integrity signature value which causes the fault to be triggered could be a specific one of these integrity signature values (e.g. the integrity signature value used for exception stack frames), or the fault may be triggered by any of these integrity signature values.

Such re-entrancy checking may be useful to provide architectural protection against a re-entrancy scenario in which having called a certain function once, the function is interrupted part way through, and then following a certain sequence of events (e.g. events including domain transitions, mode transitions, exception entry or return events, function calls function returns), the function ends up being called a second time without first having completed the remaining part of the function code from the first time the function was called. Some types of function code may not be safe to execute in such a re-entrancy scenario, as they may give the wrong result if the previous instance of the function was not fully completed before calling the function again. For example the function may implement a set of operations which need to complete atomically with respect to other instances of calling the same function. Although the function code itself could be re-designed to be safe against re-entrancy, doing this can result in a significant increase in code complexity, could introduce additional security vulnerabilities, make maintenance harder and increase code size which may be undesirable. Alternatively, rather than designing the software to be safe even if re-entrancy occurs, another approach can be to provide software which includes instruction sequences for detecting re-entrancy and preventing the execution of the function the second time if re-entrancy is detected. However, again this can be undesirable as such software detection of re-entrancy may be error prone, increase code size and reduce performance. Another option for preventing re-entrancy could be to try to reduce the likelihood that the function will be interrupted part way through, for example by boosting the priority of the function for the duration of the critical operation to prevent the interrupt or exception pre-empting that function. However this may not work in all use cases as priority boosting may only be available to certain privilege levels, and such boosting of priority may significantly disrupt interrupt latencies which may be undesirable.

It has been recognised that often in the re-entrancy scenario, this may often follow a series of exception transitions which cause the integrity signature value to be present on a relevant stack data structure indicated by the selected stack pointer in the selected stack pointer register. Hence, by triggering a load to the address derived from the selected stack pointer in response to the gateway instruction, and triggering a fault when the value loaded matches at least one of at least one integrity signature value, this provides an architectural defence against such re-entrancy. This can significantly reduce the burden on the programmer or the compiler in providing software which achieves their intended result.

By using a load triggered by the gateway instruction to perform the re-entrancy checking, this ensures that the re-entrancy checks can be performed on each entry into the secure domain. It may be counter-intuitive that re-entrancy checks are any more relevant for the secure domain than for the less secure domain, as re-entrancy is not in itself a problem for the enforcement of the boundary between the secure domain and the less secure domain (rather the primary risk of re-entrancy is that the software code may not achieve its intended result, rather than being an issue of security). However, it is recognised that software fixes for re-entrancy may cause a secondary risk of introducing security vulnerabilities that could be exploited by an attacker. Hence, by providing such architectural support for re-entrancy checking, this avoids the need for the programmer or compiler to provide software fixes for preventing or detecting re-entrancy, which reduces the chance of those software fixes inadvertently introducing security vulnerabilities. Hence, it is particularly useful to trigger the re-entrancy checking in response to the gateway instruction, as this ensures that any secure function can have the defence against re-entrancy checking automatically triggered in the architecture due to the presence of the gateway instruction which marks the safe entry point into the secure domain.

When re-entrancy checking is performed in response to the gateway instruction, a load request used for the re-entrancy checking to obtain the value from the target address may also serve as the trigger for the permission check used for the stack pointer verifying action. Hence, triggering the load may serve two purposes: the stack pointer verifying action and the re-entrancy checking.

However, such re-entrancy checks may not always be required. For some secure functions the program code may be such that it is already safe against re-entrancy, for example because it does not rely on a shared variable that needs to be updated atomically. Hence, in some examples the architecture may provide a re-entrancy checking enable value (e.g. stored in a control register) which specifies whether the re-entrancy checking is enabled or disabled. In response to the given change of program flow when the target instruction is a gateway instruction, the processing circuitry may determine whether or not to perform the re-entrancy checking in response to the gateway instruction, based on whether the re-entrancy checking enable value specifies that re-entrancy checking is enabled or disabled. Hence, the re-entrancy checking can be disabled if it is not relevant to the particular function being performed.

However, even when the re-entrancy checking enable value specifies that re-entrancy checking is disabled, the processing circuitry may still trigger the permissions check to check whether a load request to the target address would be permitted, in response to the gateway instruction, when the gateway instruction is fetched from secure memory and is the target instruction executed following the given change of program flow from the less secure domain. Although one might expect that if re-entrancy checking is disabled then there is no need to perform permissions checks for the target address, as there is no need to check whether the loaded value matches the integrity signature value, a permissions check of the target address is still useful for verifying whether it is safe to use the selected stack pointer even if re-entrancy checking is disabled, to provide protection against some forms of attack on security.

In cases where the re-entrancy checking is disabled, there are different options for triggering the permissions check performed for stack pointer verification. One approach could be that a load request is still issued nonetheless, even though the value loaded from memory is not required because the re-entrancy checking has been disabled. This can be simpler to implement in micro-architecture as it means the request triggered to perform the stack pointer verifying action can be the same regardless of whether re-entrancy checking is enabled or disabled.

However, another option would be to trigger the permissions check by issuing a load request when re-entrancy checking is performed, but when re-entrancy checking is not performed then a different type of request could be used to trigger the permissions check for the stack pointer verification action. For example, the different type of request could be an address-checking request which requests that a permissions check is performed without triggering a memory access. This can improve performance because by omitting the actual load to the target address, this can save time and power and conserve memory access bandwidth for other memory access operations.

The apparatus may have exception control circuitry for handling exceptions and exception returns. In response to an exception condition, the exception control circuitry may perform one of a number of exception entry transitions selected based at least on a current security domain of the processing circuitry (and in some cases also based on the current mode). For at least a subset of the exception entry transitions, the exception control circuitry may trigger saving of a stack frame including one of the at least one integrity signature value to a stack data structure identified by the stack pointer stored in the at least one stack pointer register. For example, the subset of the exception entry transitions for which the stack frame including the integrity signature value is saved may comprise transitions from the secure domain to the less secure domain.

On the other hand, for an exception return condition, one of a number of exception return transitions may be selected based on at least a security domain associated with the exception return condition. For at least a subset of the exception return transitions, the exception control circuitry may perform integrity signature checking for accessing a stack frame from a given stack data structure selected for that exception return transition and triggering a fault when a mismatch is detected between the value at a predetermined position in the access stack frame and said one of at least one integrity signature value. Hence, for exception return transitions, for at least some exception return transitions, the integrity signature may be required to be present on the stack data structure to avoid triggering a fault. This inclusion of an integrity signature value can provide protection against attacks where an attacker attempts to fake a certain sequence of exception entry or return transitions or function calls or returns in a way that results in an inappropriate stack frame being restored on return to the secure domain (here the attacker may be attempting to use the mismatch in stack frames to trigger the secure domain to process code from addresses in the secure domain which are selected based on information provided by less secure code controlled by the attacker). The use of the integrity signature value can allow inappropriate sequences of transitions to be detected to protect against such attacks.

Hence, while on some exception return transitions, the integrity signature value may need to be present as an indication that a valid sequence of exceptions and exception returns have been performed (the absence of the integrity signature value may trigger a fault on certain exception return transitions). In contrast, for the re-entrancy checking the fault may be triggered when the value at a predetermined location on the stack does match the integrity signature value, as in this case the integrity signature value may be a sign that a certain secure function has been called again following a previously interrupted instance of executing the same function in a case when re-entrancy is not desired. Hence, re-entrancy checks may be seen as counter-intuitive in that they trigger a fault when an integrity signature (normally used as a sign that the stacking has been handled appropriately) is detected, which is the opposite to what one might expect. Although the present invention is described in terms of detecting re-entrancy of a function following a previously interrupted call of the same function, it will be appreciated that the present invention may also protect against different forms of re-entrancy where a second secure function is called following a previously interrupted call to a first function. It may be desirable to protect any combination of function re-entrancy to the secure domain as it is common for different functions to share and modify the same state.

Where the re-entrancy checking is supported, the derivation of the target address from the selected stack pointer may be such that the target address corresponds to the address relative to the selected stack pointer at which the integrity signature value is expected to be stored. For example if the integrity signature value is located at a point on the stack frame at a certain offset from the stack pointer then that same offset may be added to the selected stack pointer when deriving the target address in response to the gateway instruction. However, in some architectures to avoid needing to perform the addition of the stack pointer and the offset (which may increase latency), the integrity signature value may be stored at the position on the stack frame corresponding to the stack pointer itself, and so in this case the target address may simply be equal to the selected stack pointer.

This technique of checking whether the integrity signature is present may be useful in cases where the re-entrancy scenario has arisen following a certain sequence of exception entry and return transitions. However, a re-entrancy scenario could also arise when a function call has been used at some point in between the first and subsequent calls of the same function, and so sometimes the load to the target address derived from the selected stack pointer could access a stack frame which was saved to memory in response to a function call being performed. For function calls, either no integrity signature value could be saved at all, or a different integrity signature value to the one saved in response to the subset of exception entry transitions could be saved, or the integrity signature value for function calls may be at a different offset relative to the stack pointer compared to the integrity signature value for exceptions. In any of these cases, checking whether the value loaded matches a given integrity signature value used for exceptions may not be enough to detect all re-entrancy scenarios. In some examples where no integrity signature is used for function calls it may be desirable to ensure that the value at the target address cannot inadvertently match the integrity signature value, as this may inadvertently trigger a re-entrancy check fault when re-entrancy hasn't occurred. To enable this some embodiments may place the function return address at the target address and select an integrity signature value that isn't an executable address, thereby ensuring that the function return address can never inadvertently match the integrity signature. In some embodiments the saving of a stack frame to memory in response to a function call may be performed by the processor automatically, and may only occur in response to a secure function calling a less secure function.

Hence, in some examples the re-entrancy checking may also comprise triggering a fault when a stack pointer selection value, for determining which stack pointer register to use for stacking or unsticking architectural state, has a predetermined value. The fact that the stack pointer selection value has a predetermined value can be another indicator that re-entrancy is occurring and so when the re-entrancy checking is enabled then triggering a fault when the stack pointer selection value has the predetermined value can provide further protection against re-entrancy checking.

For example, as discussed above the processing circuitry may support a handler mode and a thread mode. The stack pointer selection value may control selection between a process stack data structure and a main stack data structure when in thread mode. The process stack data structure identified by a stack pointer stored in a process stack pointer register may be selected for saving architectural state in response to an exception condition occurring in thread mode when the stack pointer selection value has a first value. The main stack data structure identified by a stack pointer stored in the main stack pointer register may be selected when the exception condition occurs in the thread mode and the stack pointer selection value has the second value. When the exception condition occurs in handler mode then the main stack data structure may be used regardless of the current value of the stack pointer selection value. It will be appreciated that, as described above, secure and less secure versions of the process and main stack data structures may be provided, and so which version is used may depend on the security domains associated with the background processing performed before the exception occurred.

Hence, for the re-entrancy checking the fault may in some examples be triggered when the stack pointer selection value has the second value described above, that indicates that for thread mode the main stack data structure should be used. Again, this may be a sign that re-entrancy is occurring. By triggering a fault in response to the gateway instruction when the re-entrancy checking is performed and the stack pointer selection value has the second value, this provides architectural defence against re-entrancy to simplify code development and hence reduce the opportunities for security vulnerabilities due to attempts to deal with re-entrancy in software.

In particular, this approach may be useful in architectures where in response to at least one secure thread mode to secure handler mode exception entry transition, the exception control circuitry may update the stack pointer selection value to the second value. This may be an action taken as a defence against a further type of security attack which may aim to exploit the fact that when an exception triggers a secure to secure domain transition, certain protective measures which would be performed on a transition from the secure domain to the less secure domain may be omitted, such as saving/clearing of architectural register state and saving of the integrity signature value as discussed above. Although omitting such protective measures can improve performance and may be justified when transition from the secure thread mode to the secure handler mode because the system is already in the secure domain and can be trusted, if an attacker is able to fake an inappropriate sequence of exception of function entry and return conditions so that on returning to secure thread mode a stack frame lacking the integrity signature is accessed, then this could introduce some security vulnerabilities. Although thread mode would normally be expected to access the process stack data structure, by switching the stack pointer selection value to the second value in response to at least one secure thread mode to secure handler mode exception entry transition, this means that if the processing circuitry returns back to secure thread mode through one of these inappropriate sequences of transitions and the stack pointer selection value still has the second value then the main stack data structure may be accessed instead of the process stack data structure, which can cause other security checks to fail. This setting of the stack pointer selection value to the second value can be exploited for the re-entrancy checking, because often in the case when an intervening function call is used as part of a sequence of transitions causing a re-entrancy scenario where a secure function is called a second time from the less secure domain before the previous instance of calling the function was completed, the sequence of transitions will also have included the at least one secure thread mode to secure handler mode exception entry transition in which the stack pointer selection value was set to the second value.

The re-entrancy checking described above may be omitted when there is a change of program flow from processing in the secure domain to a gateway instruction having an instruction address associated with the secure domain. Hence the re-entrancy checking may be performed for transitions from the less secure domain to the gateway instruction stored in secure memory, but is not needed when program flow switches from the secure domain to such a gateway instruction. As discussed above, the saving of the integrity signature value may only be performed when there is a transition from the secure domain to the less secure domain, and so on a program flow switch from the secure domain to the gateway instruction the stack data structure may not include the integrity signature value. This means that the value at the address derived from the selected stack pointer in the re-entrancy checking could be an arbitrary value when secure functions call other secure functions. By omitting the re-entrancy checking in response to a change of program flow from the secure domain to the gateway instruction stored in an address stored in an address associated with the secure domain, this avoids faults accidentally being triggered in cases where the value on stack accidentally happens to match the integrity signature.

As well as triggering security checks, the gateway instruction may also have the function of triggering the switch of the current security domain from the less secure domain to the secure domain. Hence when the target instruction following the given change of program flow is the gateway instruction, at least one security check (e.g. the re-entrancy check if enabled, and/or any other security checks for policing the boundary between domains) may be performed in response to the gateway instruction, and if the at least one security check is passed then the processing circuitry may trigger a switch of the current security domain from the less secure domain to the secure domain.

In the examples discussed above, the stack pointer verifying action triggered in response to the gateway instruction following the given change of program flow may comprise the triggering of a permissions check to check whether a load to a target address derived from the selected stack pointer would be permitted. This approach has an advantage in that it can share some of the overhead in performing the stack pointer verifying action (e.g. issuing of a load request) with the re-entrancy checking which may be useful for the reasons given above. Also, it means that certain valid use cases where the stack pointer selection value has the second value when calling into the secure thread mode can still be supported. In some embodiments the stack pointer selection value may still be checked if re-entrancy checking is performed, and a fault raised if the stack pointer selection value is the second value. The re-entrancy checking may not be performed if re-entrancy checking is disabled. Also the re-entrancy checking may not be performed on a secure-to-secure change of program flow from the secure domain to the gateway instruction stored in a secure region of memory.

However, in another example, when the given change of program flow is detected and the target instruction is the gateway instruction, the stack pointer verifying action may comprise triggering a fault if the stack pointer selection value has the second value. This may provide another way of protecting against the attacks which aim to manipulate the secure main stack pointer in an attempt to trigger the secure domain to perform inappropriate sequences of code. Note that unlike in the first approach discussed above where the checking of the stack pointer selection value is performed when re-entrancy checking is performed but is not performed when re-entrancy checking is omitted, with the second approach the stack pointer selection value may be checked in response to the gateway instruction regardless of whether re-entrancy checking is performed or not. Hence, this provides an alternative embodiment for checking whether it is safe to use the selected stack pointer following the given change of program flow, By triggering this action in response to the gateway instruction which is guaranteed to be present on a valid switch to the secure domain (if the gateway instruction is not present, a fault would be triggered before executing any subsequent instructions) this makes the microarchitecture design much simpler, as the actions require for checking the stack pointer selection value can be triggered by an instruction decoder in response to identifying the gateway instruction.

Regardless of which variant of the stack pointer verifying action is used, the stack pointer verifying action need not be triggered for all instances of encountering the gateway instruction following the given change of control flow. In some cases the stack pointer verifying action may be triggered when the processing circuitry is in a predetermined mode of operation at the time of the given change of program flow. For example, the predetermined mode could be the thread mode. The stack pointer verifying action could be omitted when the processing circuitry is in a mode of operation other than the predetermined mode of operation. This may be useful because the stack-pointer based attacks of the type discussed above may be most likely when entering thread mode and may not be an issue when entering handler mode. Although the checks associated with the stack pointer verifying action may be passed anyway when in handler mode (at least for the embodiments where the stack pointer verifying action comprises triggering the permissions checking of a target address derived from the selected stack pointer, where accesses from handler mode may generally pass the privilege-based checks of access permissions as handler mode may be defined as privileged by default), for performance reasons it may be preferable to omit triggering the stack pointer verifying action to save processing power and enable resources to be freed up for other purposes. For example, in embodiments where the stack pointer verifying action includes triggering of a load request, omitting the stack pointer verifying action when the processing circuitry is in handler mode can free up a slot in a load queue which can be used for other memory accesses. Hence, the restriction of the stack pointer verifying action to a predetermined mode, such as the thread mode, could improve performance. Similarly support for safe re-entrancy may be required in handler mode due to the need to support multiple nested exception handlers. Some embodiments may therefore supress re-entrancy checking when in handler mode, as for handler mode code it may be expected that the code would already be safe against re-entrancy, and so does not need further protection against re-entrancy at the architectural level.

A simulator computer program may be provided for controlling a host data processing apparatus to provide an instruction execution environment for execution of instructions. The computer program may comprise processing program logic and memory access checking program logic, which corresponds in functionality to the processing circuitry and memory access checking circuitry discussed above. Also the program may have register emulating program logic to control access to a memory of the host apparatus to simulate accesses to simulated architectural registers of a target architecture simulated by the computer program. The simulated architectural registers may include at least one stack pointer register as described above. The processing program logic may trigger the stack pointer verifying action in response to a gateway instruction of the target code being executed on the simulator. Hence, such a simulator computer program may present, to software executing on the simulator computer program, a similar instruction environment to that which would be provided by an actual hardware apparatus, even though there may not be any actual hardware providing these features in the host computer which is executing the simulator computer program. The functionality of the hardware architecture discussed above may be emulated by providing program logic, such as sets of instructions or data structures, which enables a generic host computer to execute target code intended for execution on an apparatus with the features discussed above, in a manner compatible with the results that would be achieved on an apparatus which actually has those features. The simulator computer program for controlling the host data processing apparatus may be stored on a storage medium. This storage medium may be a non-transitory storage medium.

FIG. 1 schematically illustrates an example of a data processing system 2 including processing circuitry 4 for performing data processing in response to instructions fetched from a memory system 6. The memory system 6 may include caches (e.g. one or more levels of data caches and/or instruction caches) as well as main memory. The processing circuitry 4 includes a processing pipeline including a number of pipeline stages including, for example, a fetch stage 8 for fetching the instructions to be executed from the memory system 6, a decode stage 10 for decoding the fetched instructions to generate control signals for controlling the remaining pipeline stages to perform the data processing, and an execute stage 12 for executing the decoded instructions to perform data processing operations. Registers 14 are provided for storing input operands for the instructions processed by the pipeline 4. The registers 14 include a number of types of registers including general purpose (integer) registers 16 for storing integer values, floating point registers 18 for storing floating point values and control registers 20 for storing control parameters for controlling the execution of instructions by the processing circuitry 4 and other operations such as exception handling, security checking, etc.

It will be appreciated that the pipeline stages shown in FIG. 1 are a simplified representation, and other types of pipeline stages could also be provided, such as a rename stage for performing register renaming, an issue stage for queueing instructions awaiting execution and issuing them for execution when their required operands are available, and a write back stage for handling commitment of instructions and writing back results to the registers 14. The pipeline could be an in order or out of order pipeline.

The system 2 also includes memory access checking circuitry 22 for checking whether accesses to the memory system 6 are permitted based on attribute data specified for various regions of a memory address space. The memory access checking circuitry includes a security attribute unit (SAU) 24 for storing security domain defining data which defines a security domain associated with each respective region of the memory address space. Based on the security attribute data, the security attribute unit 24 may check whether a memory access is allowed depending on a current security domain of operation of the processing circuitry and on the security domain associated with the region including the target address of the memory access. In other embodiments the SAU may not directly store the security domain defining data, but instead access security domain defining data stored elsewhere in order to perform the memory access checks. In some systems the security domain defining data may be stored in the memory system 6, or may be configuration registers elsewhere in the system 2. The processing circuitry 4 may operate in a current security domain of operation, which may generally correspond to the security domain associated with the address of the instruction currently being executed (although there may be some exceptions, e.g. when handling transitions between domains). When an instruction branches from an address in a region specified by the SAU 24 as being in one domain to an address in a region associated with a different domain, this may trigger a transition of the current security domain in which the processing circuitry 4 is operating. In other embodiments such a branch may not directly trigger a transition of the current security domain, but instead trigger additional security checks, such as whether a gateway instruction is present, in these embodiments it may be the gateway instruction itself that triggers the change in the current security domain. In general, while operating in a secure domain, the processing circuitry may have access to data in memory regions associated with both the secure domain and a less secure domain, while when operating in the less secure domain the processing circuitry may have access to the data in regions associated with the less secure domain but may not be permitted to access data in regions of the address space which the SAU 24 specifies as being associated with the secure domain. This enables protection of sensitive data against unauthorised access from code operating in the less secure domain.

Also, the memory access checking circuitry may include a memory protection unit (MPU) 26 which checks whether memory accesses to the memory system 6 satisfy access permissions which may specify, for example, which privilege levels of the processing circuitry 4 are allowed to access a given region of memory, or may specify whether a memory region of the address space can be accessed by both read and write operations or is a read only region for which writes are prohibited. The access permissions used by the MPU 26 may for example be specified by a more privileged process (such as a hypervisor or an operating system) to control which regions of memory a less privileged process (such as an application) is allowed to access, and how (read only or read/write). The permissions provided by the MPU 26 may be orthogonal to those provided by the SAU 24, so that for a given memory access to be allowed, it should pass the checks based on the access permissions defined for both the MPU 26 and the SAU 24. Although the MPU 26 is shown as a single entity in FIG. 1, in some examples separate secure and less secure MPUs 26 may be provided, each associated with one of the security domains, so that different memory access permissions can be specified for a given region of memory depending on whether the current domain is the secure domain or the less secure domain (e.g. a region could be read only in the less secure domain but both readable and writable in the secure domain).

Figure 2:
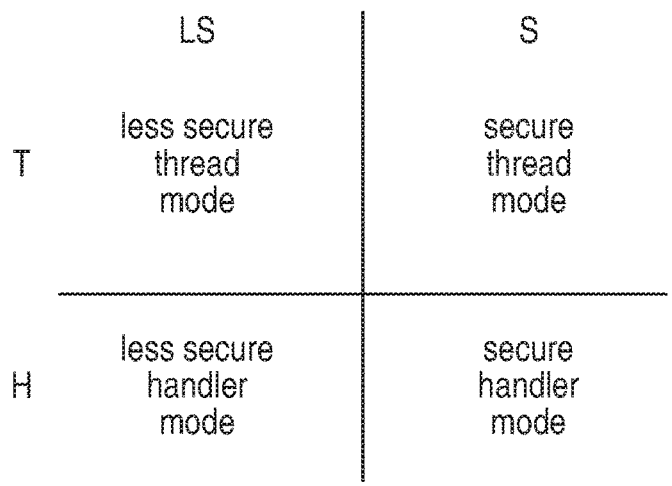
FIG. 2 shows an example of different domains and modes of operation of the processing circuitry.

Hence, as shown in FIG. 2, the processing circuitry 4 may support performing data processing in one of a number of security domains including at least a secure domain (S) and a less secure domain (LS). Although FIG. 2 shows a system with only two security domains, it would be possible to provide three or more domains associated with different levels of security.

Also, within a given security domain, as shown in FIG. 2 the processing circuitry may perform data processing in one of a number of modes, including a handler mode (H) for exception processing and a thread mode (T) for background processing. As shown in FIG. 1, exception control circuitry 28 may be provided to control exception handling operations, including exception entry transitions and exception return transitions, and any saving/restoring of architectural state during such transitions. The separation of exception handling into a dedicated handler mode H can be useful to simplify management of which registers are allowed to be accessed by the processing circuitry (e.g. some registers used for exception handling may be accessible in the handler mode H but may not be accessible in the thread mode T). In general, when operating in the handler mode H then the processing circuitry 4 may by default be assumed to have a more privileged mode of operation so that access to memory and registers is controlled according to a certain level of privilege level other than the least privileged level, while in the thread mode T the processing circuitry may have one of a number of different privilege levels depending on other architectural state stored in the control registers 20.

Hence as shown in FIG. 2, the combination of the security domain and the mode in which the processing circuitry 4 is operating may determine aspects of how processing is carried out by the processing circuitry 4. FIG. 2 shows four different combinations of these modes, including:
  secure thread mode (shorthand for the combination of the secure domain and the thread mode)
  less secure thread mode (combination of the less secure domain and the thread mode) secure handler mode (combination of the secure domain and the handler mode) and
  less secure handler mode (combination of the less secure domain and the handler mode).

As discussed below, in response to exception conditions, and exception return conditions, the actions carried out may depend on the particular transition being made between these respective combinations of security domain and mode.

Figure 3:
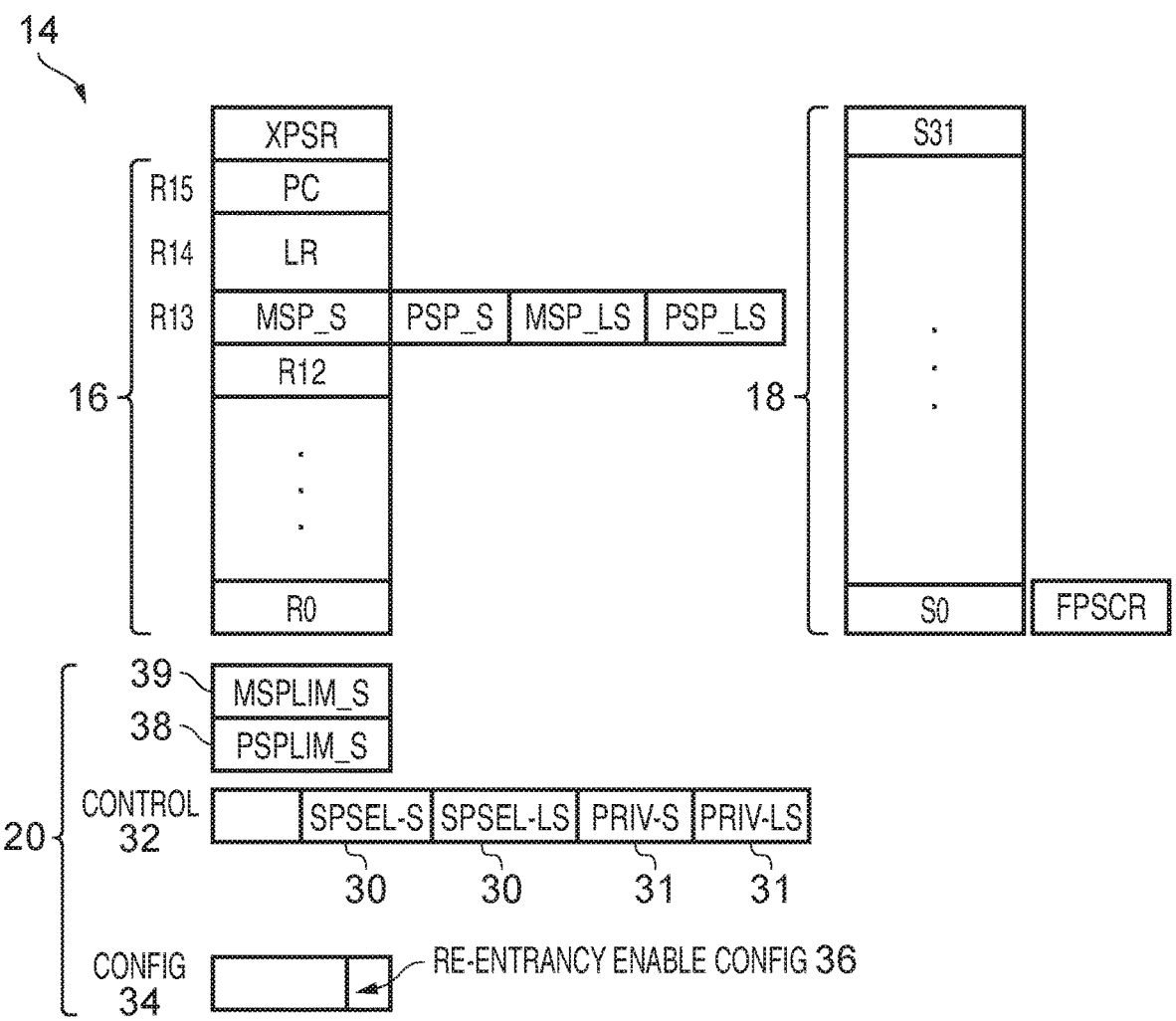
FIG. 3 shows an example of registers of the processing circuitry.

FIG. 3 shows some of the registers 14 of the processing system. It will be appreciated that this representation does not show all of the possible registers which may be provided, and many other registers may also be provided. As shown in FIG. 3, the registers 14 include the general purpose registers 16, the floating point registers 18, and a number of control registers 20 (only some of the control registers are shown in FIG. 3—others can also be provided). In this example there are 16 general purpose registers provided, labelled R0 to R15, and 32 floating point registers, labelled S0 to S31. In some embodiments the floating point registers 18 may also include floating point status and control register (FPSCR) that may hold floating point flag values, floating point rounding modes, etc. In some embodiments the general purpose registers 16 may also include a program status register (XPSR) that may hold integer flag values, and other information related to the current context.

Among the general purpose registers R0 to R15, registers R0 to R12 are used for storing general purpose operands, such as the input operands for arithmetic or logical instructions or the operands used to derive addresses for load/store instructions for accessing the memory system 6. It may be possible to use the general purpose registers R13 to R15 for such general purpose operands, but they also serve other control functions.

Register R15 is used as a program counter (PC) register which stores a program counter which provides an indication of the current point of the program reached by the processing circuitry 4. The program counter register can be used by the fetch stage 8 to determine which instructions to fetch from the memory system.

Register R14 is used as a link register (LR) which is used for storing function return addresses when a function is called so that when the processing associated with the function is complete then the address in the link register can be used to redirect the program flow back to the next instruction after the function calling instruction. Also the link register can be used on occurrence of an exception to store an exception return value which provides information for controlling unstacking of architectural state when the corresponding exception return condition is encountered. This will be discussed in more detail below.

Register R13 is used as a stack pointer register which provides a stack pointer indicating an address of a stack data structure in memory. The stack data structure can be used for saving architectural state when an exception condition occurs and for restoring architectural state when an exception return condition occurs. As shown in FIG. 3, register R13 is banked so that a number of different physical registers are provided in hardware, each accessible using the register specifier R13, with the particular banked register that is selected when R13 is specified depending on the current security domain and mode of the processing circuitry.

For example the banked stack pointer registers may include a secure main stack pointer register (MSP_S), a secure process stack pointer register (PSP_S), a less secure main stack pointer register (MSP_LS) and a less secure process stack pointer register (PSP_LS). In general the secure stack pointer registers MSP_S and PSP_S are accessible to the processing circuitry 4 when in the secure domain S but are inaccessible when in the less secure domain NS. The less secure stack pointer register MSP_LS and PSP_LS are accessible in the less secure domain. In general, the process stack pointers PSP_S or PSP_LS are expected to be used within thread mode T, and the main stack pointers MSP_S or MSP_LS are expected to be used within handler mode H. The provision of separate main and process stacks for handler mode and thread mode respective can make development of exception handler code simpler, as it means that any data which exception handlers may leave on the main stacks is not generally accessible to the thread running in thread mode after exception return. This can simplify development of exception handler code as the exception handler does not need to include instructions for clearing all of its data from the main stack data structure. However, as will be discussed in more detail below, it is possible for some processes in thread mode T to use the main stack pointer, with a stack pointer selection value 30 stored in a control register 32 controlling whether the main stack pointer or the process stack pointer should be used when in thread mode T. Hence, which stack pointer should be used may be determined based not only on the combination of the current mode (thread or handler) and current domain (secure or less secure) but also on the stack pointer selection value 30. As shown in FIG. 3, the stack pointer selection value 30 may be banked between the security states, so that the secure and less secure domains can independently control whether secure and less secure thread mode respectively use the main stack pointer, using separate secure and less-secure versions SPSEL-S, SPSEL-LS of the stack pointer selection value 30.

In general, within the body of an exception handler operating in handler mode H or the thread operating in thread mode T, the choice of secure or non-secure stack pointer may depend on the current security domain in which the processing circuitry 4 is executing code. For exception entry and return, the stacking and unstacking of state is performed from the stack identified by the stack pointer which is associated with the security domain of the background code which was running before the exception occurred.

The control register 32 may also include a privilege control value 31 which controls whether code executed in thread mode is privileged or unprivileged. The privilege control value could be set differently for the secure and less secure domains (e.g. secure thread mode could be unprivileged while less secure thread mode could be privileged, or vice versa). Alternatively both secure and less secure thread mode could operate at the same level of privilege. It will be appreciated that the privilege control value 31 is just one example, and there may be other ways of using architectural state stored in a control register to control the level of privilege assigned to code in secure/less secure thread mode. In the example of FIG. 3, the privilege control value 31 is banked so that separate secure and less-secure privilege control values PRIV-S and PRIV_LS are provided for controlling the privilege level used by thread mode in the secure and less secure domains respectively. However, another approach could be to provide a single control bit which is switched on domain transitions.

As shown in FIG. 3, the control registers 20 may include a configuration register 34 which may store configuration data including a re-entrancy enable configuration indicator 36 which may specify whether the processing circuitry should perform re-entrancy checks in response to a secure gateway instruction as discussed below.

Also the control registers 20 may include one or more secure stack pointer limit registers 38, 39 which are used to specify a limit address which provides a limit to the extent to which the secure stack data structures pointed to by the secure stack pointers MSP_S and PSP_S can grow. In this example there are two limit registers, one 39 for the secure main stack pointer MSP_S and one 38 for the secure process stack pointer PSP_S. A limit address within each limit register can be used to limit how far the stack data structure can extend. If the processing circuitry or the exception control circuitry 28 detects that the main or process secure stack data structure has extended beyond the limit address in the corresponding limit register 38, 39 (or detects an attempt to update the stack pointer to a value beyond the limit address), then the exception control circuitry 28 may trigger a fault to be signalled which may itself trigger an exception and then an exception handler may respond to the fault by taking some recovery action or other measure to ensure security. This can be useful to ensure that an attacker cannot break security measures by causing so many exceptions, or by calling so many functions, so that the stack data structure extends into a region used for other data which could corrupt that data in those other regions.

One aspect of handling exception entry and return is the stacking and unstacking of architectural state. When an exception condition occurs, some of the architectural state stored in the registers 14 may need to be saved to memory so that even if the exception handler executed after the exception has been entered overwrites those registers, the previous contents of the registers can subsequently be restored from memory when it is desired to return to the processing being performed before the exception occurred. The stack data structure pointed to by one of the banked stack pointer registers shown in FIG. 3 can be used to save this state.

For performance reasons, it can be useful to divide the registers which may need to be saved in response to such exception entry events into two groups, referred to as the "caller" registers and the "callee" registers. The caller registers are the registers for which the exception control circuitry 28 implemented in hardware has responsibility for saving to the stack. Hence, there is no need for software of the exception handler to include instructions for saving the caller registers to the stack data structure.

Figure 4:
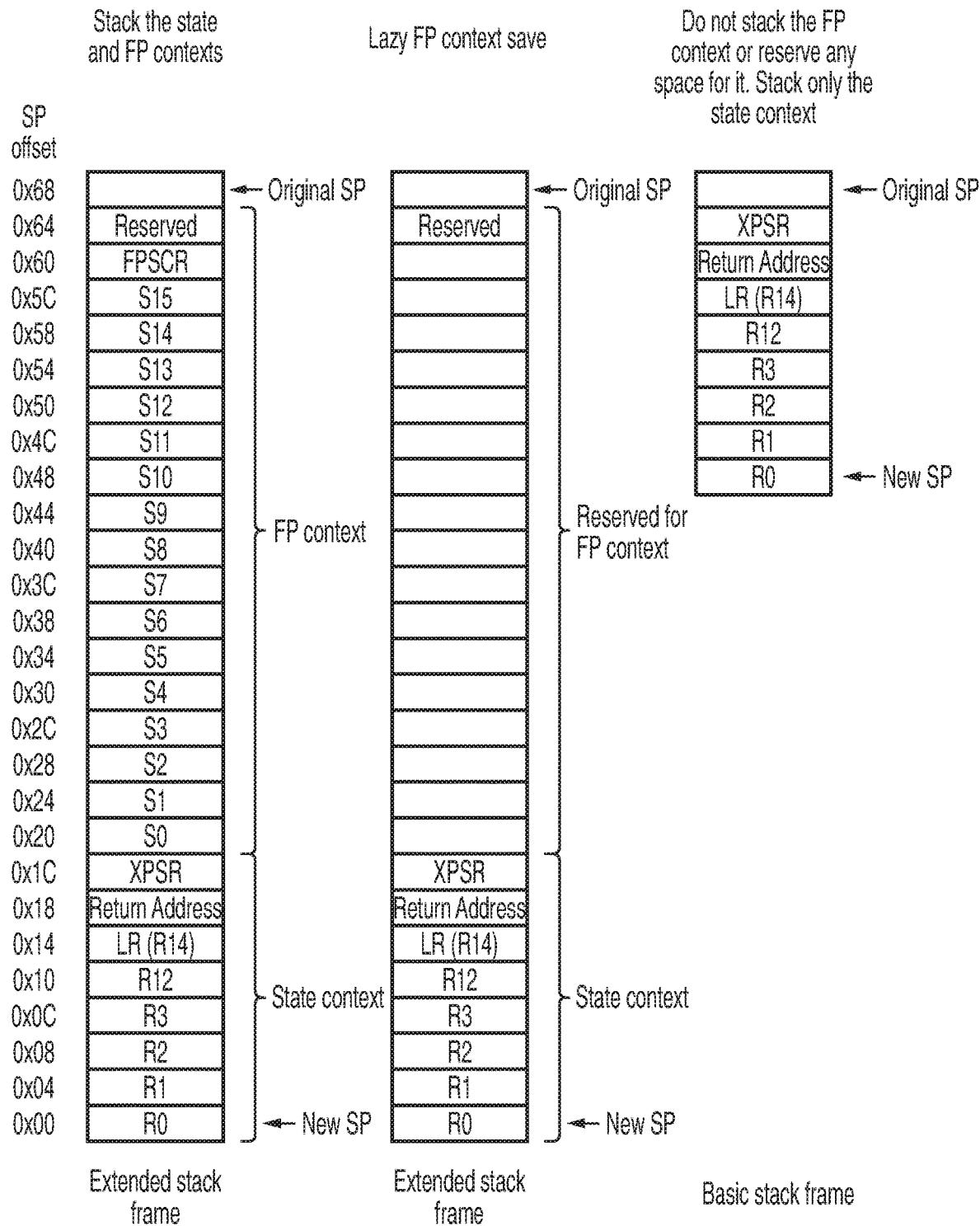
FIG. 4 shows a number of examples of a first exception stack frame which omits architectural state associated with callee registers, and omits an integrity signature.

As shown in FIG. 4, the caller registers may include a subset of the general purpose registers. In this example, the caller state includes general purpose registers R0, R1, R2, R3 and R12, the link register LR (R14), an indication of the return address to which processing is to be returned after processing of the exception, and a program status register XPSR which may provide condition codes for controlling outcomes of conditional instructions. It will be appreciated that this is just one particular example of which register state could be included in the caller registers.

As shown in the basic stack frame in the right hand part of FIG. 4, for processes which do not use any of the floating point registers 18, the basic stack frame may only include certain integer registers 16 or control registers 20 and the return address. However, if the process executing before the exception also uses the floating point registers 18, then as shown in the extended stack frame on the left hand side of FIG. 4, the caller registers may also include a subset S0-S15 of the floating point registers 18. The floating point context could also include additional control registers such as a floating point state control register FPSCR which is used to control processing of floating point operations.

As shown in the middle part of FIG. 4, it is also possible for the extended floating point stack frame to include space reserved for the additional floating point context, but to not actually have the floating point context saved to this reserved space on the stack at the time of handling the exception entry. Instead, lazy floating point context saving could be used, where in response to the exception the space is reserved on the stack so that the new stack pointer generated following the exception entry is predictable, but the actual saving of floating point context to this reserved space is deferred until the first time floating point state is needed following the exception. In this way, if a subsequent exception return occurs before any floating point context has been accessed by the exception handler, the time and energy expended in saving the floating point context from the floating point registers 18 to memory can be avoided.

Hence, all of the example stack frames shown in FIG. 4 are an example of a caller register stack frame (first stack frame) which includes state saved from the caller registers but does not include state associated with the callee registers.

After the caller stack frame has been saved to the stack by the exception control circuitry 28 in response to the exception event, the execution of the exception handling code may start, and then the exception handler software may save state from additional callee registers onto the stack, if it knows it will be overwriting this state during its execution. However, this state saving by the exception handler is performed by controlling a load/store unit of the processing circuitry 4 to save the relevant data off to memory in response to load/ store instructions provided in the exception handler code, which may be slower than if the exception control circuitry 28 controlled the stacking in hardware. However, it can be beneficial to allow a partition between the caller and callee register state, so that the software executing after the exception has been entered can influence which registers are needed to be saved. If the exception handler will never access a particular callee register (general purpose register R7 or floating point register S27, for example) then the exception handler does not need to save the corresponding architectural state and the energy and time associated with having done this state saving in exception control circuitry 28 and hardware has also been avoided. Writers of code for exception handlers, or compilers of such code, could be encouraged to first use the caller registers before using the additional callee registers, to reduce the chance that additional state saving in software is needed.

However, if the exception entry causes a transition from the secure domain to the less secure domain and the original background processing being performed in thread mode before the exception was in the secure domain, then if only the caller registers are saved to memory by the exception control circuitry 28 this may leave the callee registers accessible within the register bank 14 to the less secure exception handler to be executed after the latest exception. This may be undesirable as the callee registers could include information derived from secure regions of the memory address space which the SAU 24 would otherwise prevent the less secure exception handler accessing.

Therefore, for certain transitions from the secure domain to the less secure domain where background processing was previously performed in the secure domain, the exception control circuitry 28 may, in addition to saving of the caller registers, also save the callee registers to the relevant stack data structure and may clear contents of the registers that have been saved (including caller and callee registers). Hence by performing additional state saving in hardware, this means that the software which would normally save the callee registers cannot gain access to potentially secure information stored in these registers before the exception occurred.

Figure 5:
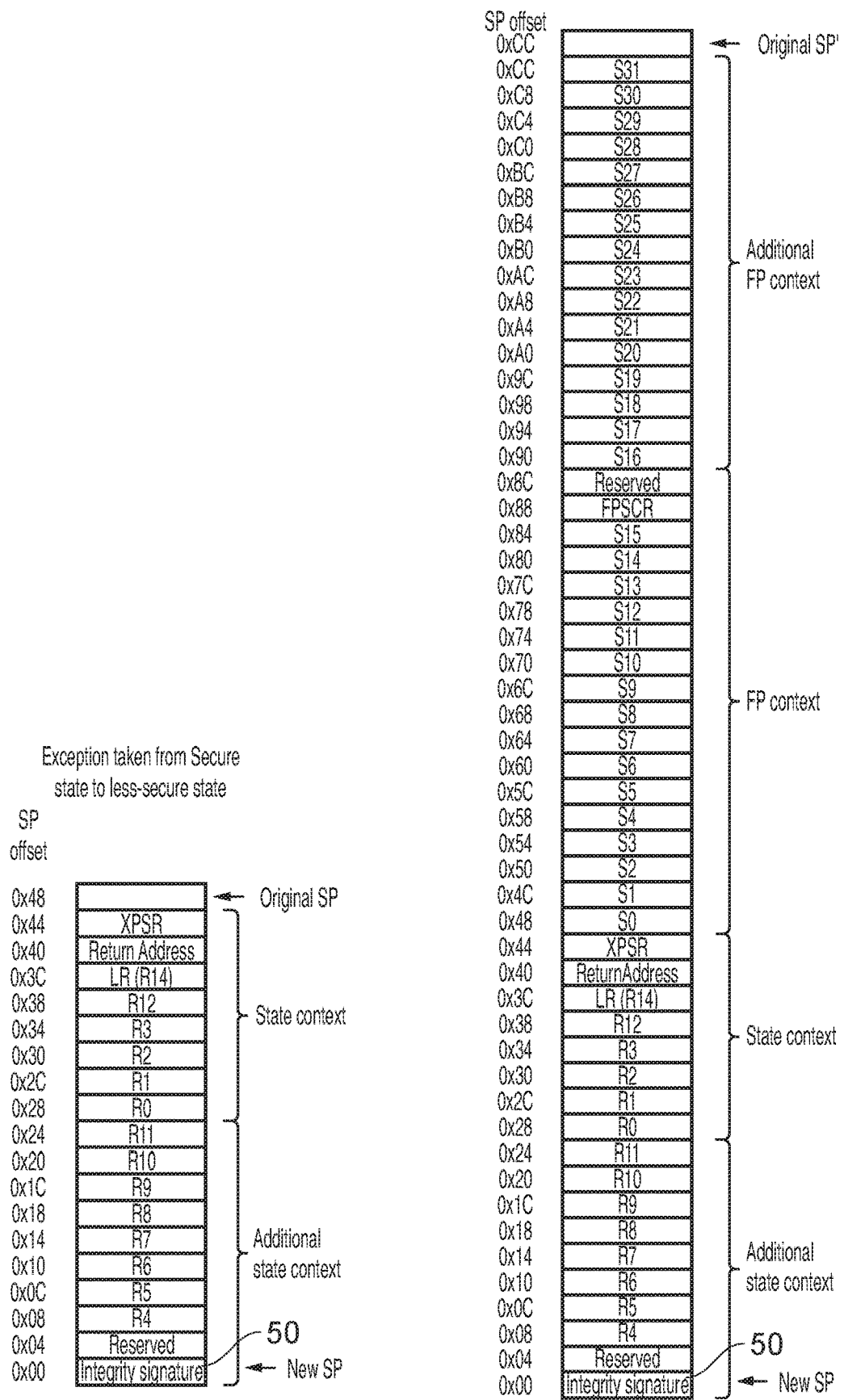
FIG. 5 shows an example of a second exception stack frame which includes additional architectural state from the callee registers and includes the integrity signature.

Hence, for certain exception entry transitions, instead of storing the caller stack frame shown in FIG. 4, instead a second stack frame as shown in FIG. 5 may be saved (under hardware control by the exception control circuitry 28, i.e. without needing explicit load/store instructions to be executed by the processing circuitry 4). Again, as shown in the left hand part of FIG. 5, for cases where no floating point context is needed then the stack frame may omit saving of any floating point state. In this case, the second stack frame includes both the caller state shown in FIG. 4 and also the additional callee state including registers R4-R11. The additional state saved by the hardware may also include an integrity signature 50 which will be described in more detail below. Alternatively, for cases where the floating point context also needs to be saved, then in addition to the caller state shown in the left hand example of FIG. 4, the extended second stack frame also includes the additional callee floating point registers S16 to S31, as shown in the right hand side of FIG. 5. Although not shown in FIG. 5 some embodiments may reserve the space for callee and caller floating point registers, and lazily save those registers in the same way as described for FIG. 4.

Hence, the basic caller stack frames shown in the examples of FIG. 4 may be an example of a first exception stack frame, and the stack frame examples of FIG. 5 which also include additional architectural state associated with the callee registers may be an example of the second exception stack frame which includes a subset of architectural state data from the registers that is omitted from the first exception stack frame. On exception entry transitions the exception control circuitry may select which of the first and second exception stack frames should be saved by the hardware, for example depending on the security domains associated with the processing performed before and after the exception or on other state information associated with the control registers 20. Whether the floating point context is saved or not and whether the lazy floating point context saving option is used may depend on control parameters specified in one of the control registers 20.

The integrity signature 50 is included in the second exception stack frame when both caller and callee state is saved by the exception control hardware 28, but is missing from the first exception stack frame shown in FIG. 4. The integrity signature 50 may have a special reserved value which does not correspond to an executable address, for example an address that causes a fault to be signalled if an attempt is made to fetch an instruction from it. This integrity signature can be used to detect certain forms of attack which may be mounted on the processing circuitry to try to circumvent the security protections provided by the hardware enforcing the partitioning between the secure and less secure domains. One possible avenue for attack can be that the attacker attempts to perform an exception entry transition to enter into processing of the exception, but then later fakes a different type of return transition to the one expected to return from the exception entry, such as performing a function return transition. The signature 50 may be located at a position on the stack frame which would be expected to store a function return address if a function return is made, and as the integrity signature 50 may have a special value which does not correspond to an executable address, this means that no valid function return address can match the signature. Hence, if it is detected on a function return that the return address matches the integrity signature 50 (or that it corresponds to a non-executable address), a fault can be triggered, as it means that the stack frame being used to perform the function return was actually saved to the stack in response to an exception entry event, which could be an indicator that an attack is being performed. Also, on returning from an exception for which the additional architectural state associated with the callee registers is present on the stack, part of the security checking may be checking whether the value at the relevant offset in the stack corresponding to the integrity signature 50 has the expected value, as the lack of the signature may indicate that an inappropriate sequence of exception entry and return events has been triggered.

Hence, the provision of the integrity signature on the stack is an example of a protective action which may be performed for certain exception entry transitions. In particular this saving of the integrity signature onto the stack may occur for at least one form of secure thread mode to less secure handler mode exception entry transition. However, the integrity signature 50 is not included in the basic caller stack frame as shown in FIG. 4, because when performing exception entries from the secure domain to an exception handler also in the secure domain, it may be expected that the protective measure is not required. Avoiding the callee state (including the integrity signature) in hardware can help to reduce interrupt handling latency for cases when a secure exception occurs during processing of secure background processing in thread mode, and no other exception occurs during processing of the secure exception so that the next exception return simply back to the previous secure background processing.

Figure 8:
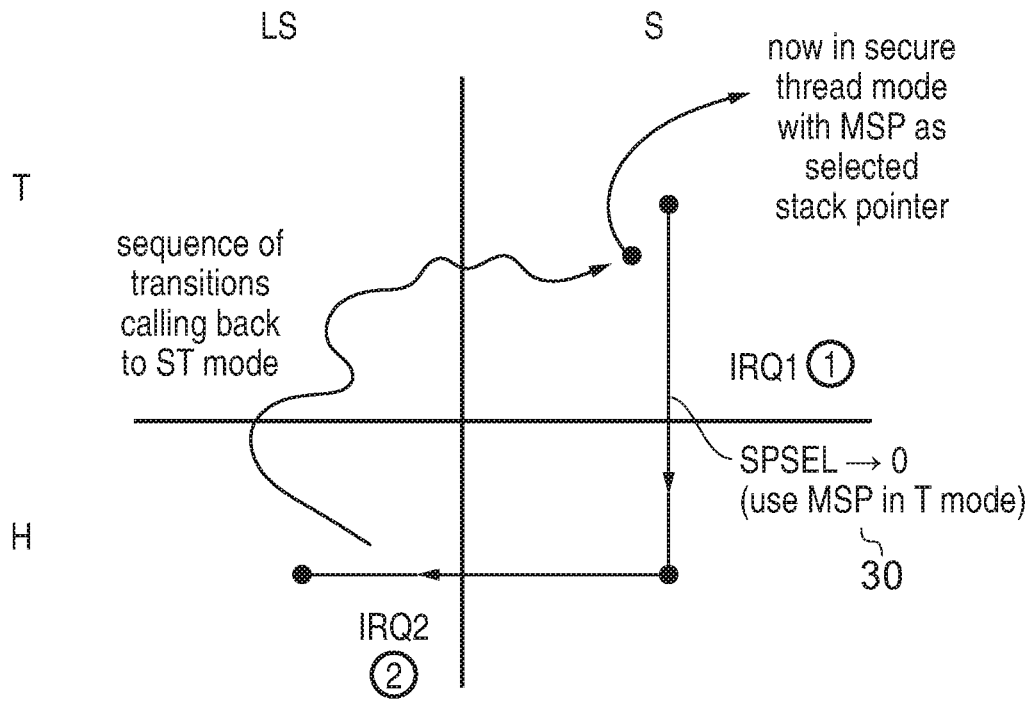
FIG. 8 shows a potentially inappropriate sequence of domain/mode transitions which it may be desirable to detect.

However, as shown in FIG. 8, the omission of the protective action for the secure thread to less secure handler mode exception entry transition can sometimes provide an avenue which an attacker could exploit. FIG. 8 shows the following sequence of events:

1. An interrupt (IRQ 1) causes a transition to Secure handler mode. The caller saved registers are automatically saved to the secure process stack (indicated by PSP_S) by the exception control hardware 28. To reduce the interrupt handling latency the callee saved registers are not saved, so the first exception stack frame of the type shown in FIG. 4 is saved (omitting the integrity signature). This is acceptable as the target state is Secure so it can be trusted not to corrupt these registers.
2. Another interrupt (IRQ 2) causes a transition to Non-secure handler mode. At this point the hardware preserves both the caller and callee saved registers, as the transition is to the Non-secure state, which cannot be trusted to handle Secure values. Hence, a second exception stack frame of the type shown in FIG. 5 is saved to the secure main stack indicated by MSP_S. The main stack is used as this exception occurred during processing in handler mode.
3. An attacker with control over the non-secure domain could then fake a sequence of exception returns or function returns back to secure thread mode (instead of the expected exception return to secure handler mode to return from IRQ2). As the stack frame saved to the secure process stack at step 1 does not have the integrity signature on its stack, there is a potential for a security breach, if the unstacking on the return to the secure thread mode attempts to unstack the caller-only exception stack frame saved to the secure process stack at step 1.

This issue can be addressed by, at step 1, setting the stack pointer selection value 30 to indicate that the thread mode should subsequently use the main stack pointer (MSP) for unstacking operations, instead of the process stack pointer (PSP) which would normally be used in thread mode. This means that if the attacker fakes the false exception return at step 3, the unstacking will be from the main stack and not the unprotected process stack. Since the stack frame on the main stack is actually for the return of IRQ2 (which is to handler mode) and not for a return to thread mode, other integrity checks may fail (e.g. a mismatch may be detected between the mode actually returned to and the mode indicated in the unstacked state as being the mode intended to be returned to when the stack frame is unstacked). Hence, the attack can be detected.

FIG. 6 is a table showing a number of different forms of exception entry transition which may be supported by the exception control circuitry. As shown in the first four columns of the table, which exception entry transition is selected depends on the security domain and mode associated with the background processing being performed before the exception entry occurs, whether the background processing was using the main stack pointer or the process stack pointer as indicated by the stack pointer selection value 30 for thread mode, and on the security domain associated with the exception condition itself. For example, the type of exception which has occurred may imply whether it is a secure or less secure exception, or the exception may be associated with additional control information which specifies which security domain is associated with the exception. Note that there are no transitions which correspond to the background processing performed in the handler mode which use the process stack pointer, because the process stack pointer can only be used if the background mode is thread mode. Hence there are no equivalents of row 9 to 12 of the table for the cases when the background mode is the handler mode.

The fifth column of the table of FIG. 6 illustrates, for each of the different exception entry transitions, which stack frame format is used.

For the transitions indicated in rows 5 to 8, 11 and 12, only the caller saved registers need to be saved, because the background processing being performed was in the less secure domain and so there is no risk of loss of sensitive information if the callee registers are not saved.

For the transitions shown in rows 2, 4 and 10, the background processing was in the secure domain and the target security domain for the exception is the less secure domain and so the additional state saving of the callee saved registers is performed by the exception control circuitry 28 in hardware to prevent data in these registers being leaked to the less secure exception handler.

For the transitions shown in rows 1, 3 and 9 of FIG. 8, while the architecture may only require that the caller registers are saved, it may permit the callee registers optionally to be saved as well if desired. This could be useful because if the system is first performing a type of exception entry transition which requires saving of both the caller and callee saved registers, but then while saving the callee registers a higher priority exception occurs and so instead a different exception entry is selected which did not require the callee registers to be saved, it may be simpler for the hardware to continue saving the callee registers rather than halting the saving and having to undo the changes associated with the previous saving of callee registers that had already taken place in response to the first exception. The exception return value which is written to the link register R14 may include a flag DCRS which may be set to indicate whether the default stacking rules have been followed and only the caller registers are on the stack, or whether the callee registers have also been placed on the stack. This flag can be checked when performing an exception return to determine what unstacking needs to be performed and also may be used to determine what integrity checks should be performed based on the integrity signature. This exception return value which is placed in the link register could also specify other information for reference during exception return, such as whether the secure or less secure stack was used for stacking, a flag indicating the mode of operation from which the stacking was performed (and to which the corresponding exception return is expected), or a flag indicating whether the stack frame is a standard integer only stack frame or is an extended floating point stack frame. It will appreciated that other information can also be indicated in the exception return value.

FIG. 7 is a table showing a number of different forms of exception return transition which can be used by the exception control circuitry 28 to return processing to previous processing performed before an exception was taken. As shown in the first 5 columns of the table, the particular transition selected depends on the security domain associated with the exception, the security state when the exception return was requested, the stack pointer being returned to, the mode being returned to and the security state being returned to. Which stack pointer, mode and security state is being returned to may be determined based on information associated with the exception return instruction which triggers the exception return event. The security state when the exception return was requested may be different to the security domain associated with the original exception because there could for example have been a function call since the exception was taken which could have resulted in a transition between the less secure and the secure domain. Hence the security domain associated with the exception can also be determined from a flag placed in the exception return value in the link register when the exception was taken. Similar to the exception entry transitions in FIG. 6, for FIG. 7 there are no "return to handler" equivalents of the transitions in rows 5, 6, 11, 12, 17 and 18, because it is not possible to use the process stack pointer in the handler mode. Also there are no exception return transitions returning from a secure exception while currently in the less secure state (i.e. no mirrors of rows 1 to 6 where the security state when the exception return requested is less secure) as these transitions are also prohibited. While a less secure exception can subsequently call a secure function which then triggers an exception return, for a secure exception it is not allowed for the secure exception to then call a less secure function which triggers an exception return.

The sixth column of FIG. 7 illustrates, for each of the exception return transitions, whether the callee registers are expected to be present on the stack frame associated with this exception, and hence whether any integrity signature checking is required to determine whether a value at a particular offset on the stack frame matches the expected integrity signature value. For most of the exception return transitions, either the callee registers are not expected and no integrity signature is checked, or the callee registers are expected and the integrity signature checking is performed. However for the transitions shown in rows 1, 3 and 5 (which correspond to exception entry transitions from rows 1, 3 and 9 of FIG. 8, which may optionally have saved callee registers in addition to caller registers), whether or not the callee registers are expected and the integrity signature is to be checked may depend on the DCRS flag which was saved in the exception return value in the link register when the exception was taken.

A potential attack exploiting the missing integrity signature was described above with respect to FIG. 8, which is addressed by setting the stack pointer selection value 30 in response to a secure-to-secure exception entry transition. However, to protect against another form of attack, it may be desirable to provide architectural means for detecting a sequence of transitions which causes a switch back to secure thread mode in a scenario where the stack pointer selection value 30 indicates that the main stack pointer is to be used by thread mode as the selected stack pointer.

Processing circuitry 4 may support a certain instruction called a gateway instruction (or "secure gateway" instruction, SG) which can be used to mark the valid entry points into the secure domain when switching to the secure domain from the less secure domain. On a change of program flow from the processing in the less secure domain to an instruction at the instruction address which the SAU 24 indicates is associated with the secure domain, the processing circuitry 4 may check whether the first instruction executed at the target address after the change the program flow is the secure gateway instruction, and if not, the processing circuitry 4 may trigger a fault. The writer or compiler of secure code can mark the points of the code at which less secure code is allowed to call into the secure code using the secure gateway instruction. This prevents less secure code being able to branch into arbitrary locations within secure code which could cause security vulnerabilities by allowing some security measures to be bypassed for example. For example, if the secure code includes a password check, if no protection against arbitrary branch points was provided then this could allow less secure code to branch into a part of the secure function beyond the password check, effectively allowing the password check to be bypassed even if the non secure code does not possess the correct password. This is a relatively simplistic example, but there may be other more complex examples where there may be significant security risks if less secure code is able to branch to certain points within a secure function. Hence, the provision of the secure gateway instruction can guard the valid entry points into the secure code and any other entry points may be treated as an invalid entry point triggering a fault to improve security.

As the secure gateway instruction will generally be present at the valid entry points into the secure domain, then the secure gateway instruction can also be used to trigger a check of the secure main stack pointer to check whether it is safe to use the secure main stack pointer stored in register MSP_S. Even if an attacker provides code for a malicious secure function which includes the secure gateway instruction, the secure gateway instruction can still be trusted to trigger the processing circuitry 4 to perform extra security checks on the stack pointer because even if the rest of the secure thread mode code is malicious, the attacker cannot avoid providing the secure gateway instruction because any instruction other than the secure gateway instruction at the point where the secure thread mode code is entered will trigger a fault.

In one example, the stack pointer verifying action triggered by the secure gateway instruction on a transition from the less secure domain may simply be checking whether the stack pointer selection value 30 is equal to 0, indicating that the main stack pointer should be used in thread mode. Hence, if the stack pointer selection value is equal to 0, this may trigger a fault. This may protect against the attack, but may exclude some valid use cases where it may still be desirable to allow secure thread mode to use the main stack pointer.

Therefore in the example discussed below, the stack pointer verifying action may instead involve triggering permissions checks to check whether the memory access checking circuitry 22 would permit a load request which specifies a target address derived from the stack pointer indicated by the stack pointer selection value 30 as to be used in secure thread mode. Hence, in cases where the stack pointer selection value 30 has previously been set to indicate the main stack pointer, the permission checks may be based on an address stored in the secure main stack pointer register MSP_S, to check whether thread mode is permitted to access the stack data structure indicated by the main stack pointer, and therefore whether it is safe to use the stack pointer.

Figure 9:
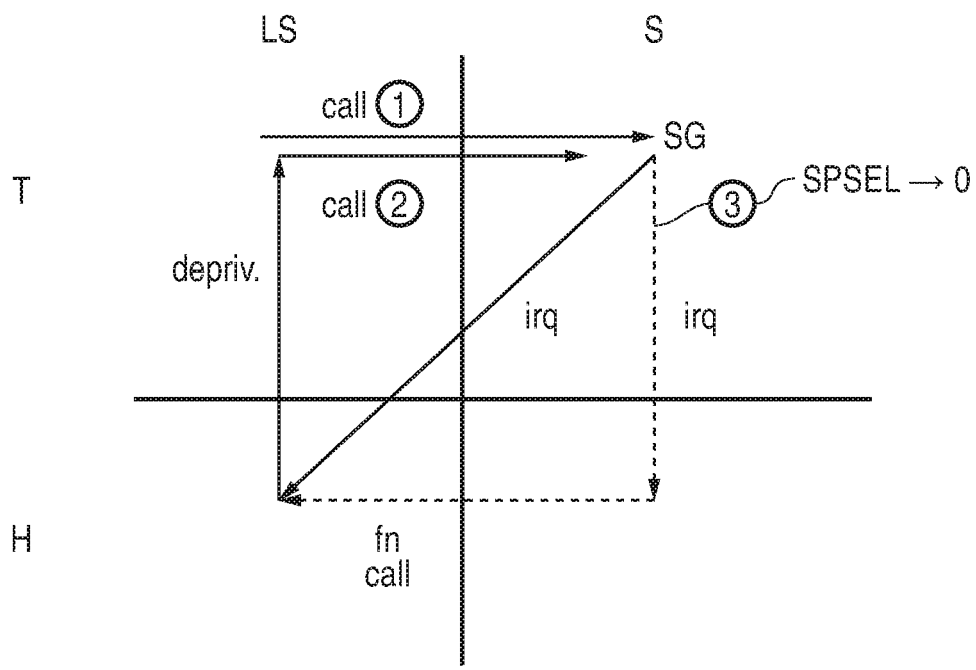
FIG. 9 illustrates an example of a re-entrancy scenario, where a function is called a first time, interrupted part-way through, and then called a second time without having completed the remaining part of the function code from the first time the function was called.

In some cases, the secure gateway instruction may actually trigger a load request to the target address, to invoke the permissions checks performed by the memory access checking circuitry 22 for the target address of the load. Such a load request can also be useful as a defence against re-entrancy scenarios which could sometimes lead to incorrect processing results. This is illustrated in the example of FIG. 9. At point 1 a secure thread mode function is called from the less-secure state. The first instruction after the branch to the Secure state should be an SG instruction (otherwise a fault is raised). Before this call the non-secure state setup a timer interrupt to fire after a specified amount of time. The non-secure code can arrange for this timer to fire when during a critical secure operation that is not designed to support re-entrancy. When the timer fires control is redirected to the less-secure handler mode. Less-secure handler mode then returns to less-secure thread mode (deprivilege operation). At point 2 the less-secure thread mode calls into secure state again. This can lead to a re-entrancy attack as the secure state is being re-entered when it hadn't completed a critical operation that wasn't designed to be safe against re-entrancy. For example, the critical operation could be an operation such as the update of an event counter for counting the number of occurrences of a given event. In response to each occurrence of the event, the following function could be called (where #count represents the address at which the counter value is stored in memory):

LDR r0, [#count] //load current count value from memory
ADD r0, r0, #1 //add one to the current count value
STR r0, [#count] //store updated count value back to memory.

If the timer interrupt occurs between the load and the store instruction, and then the function is called again on a subsequent occurrence of the event, the this can lead to one of the two occurrences of the event being missed in the counting, as both instances of executing the function will have read the same initial value for the load instruction and so only one increment of the count will take place despite the function being called twice. It will be appreciated that this is a relatively simple example, and many other examples of code that is not safe against re-entrancy could be provided.

Although such re-entrancy issues may affect both secure and less secure functions, it may not be considered justified to provide architectural functionality for checking whether re-entrancy occurs for less secure code, because there may be software techniques by which the writer or compiler of software can design less secure functions to be safe against re-entrancy or include checks for detecting whether the re-entrancy has occurred and although this may increase code or reduce performance, it may not be expected to introduce any security vulnerabilities when the code is executed in a less secure domain. However for the secure domain, it is possible that such software techniques for detecting or protecting against re-entrancy could introduce security vulnerabilities and so the reduce the chance of such vulnerabilities, it may be preferred to provide an architectural check for whether re-entrancy has occurred.

For the re-entrancy checking, it is recognised that the re-entrancy scenario for a secure thread mode function occurs either when there has been an exception entry transition from the secure domain to the less secure domain (solid lines in FIG. 9) or when there has been a function call from the secure domain to the less secure domain following an exception entry transition from the secure domain to the secure domain (dotted lines in FIG. 9). In the case of a secure-to-less-secure exception transition (solid lines), the integrity signature value will be expected, and so on calling the secure function in thread mode from the less secure domain a second time (call 2 labelled in FIG. 9), when the secure gateway is present, a load may be triggered specifying as its target address the selected stack pointer which is selected for use in the secure thread mode based on the step pointer selection value 30. The processing circuitry can check whether the integrity signature 50 is present at that address, and if so trigger a fault because this will indicate that the relevant stack frame which was saved to memory in the exception entry transition from the secure domain to the less secure domain has not yet been unstacked in a corresponding exception return, which is an indication that this is a re-entrancy scenario into the same secure function code without having preciously completed the previous instance of processing the same secure function.

On the other hand, if a function call has been used (dotted lines in FIG. 9), the integrity signature 50 would not be present at the location on the stack indicated by the selected stack pointer value, but in this case the re-entrancy can be detected because the stack pointer selection value (SPSEL) 30 at the point of making the second call to the secure thread mode will still be set to 0 indicating the main stack pointer is to be used, because the transition labelled 3 in dotted lines in FIG. 9 would have caused the stack pointer section value to be set to 0, and in the case of re-entrancy the stack pointer selection value will not yet have been set back to 1 because there would not yet have been any corresponding exception return transition reversing the interrupt marked as 3 in FIG. 9, Hence, SPSEL having a value of 0 on calling the secure thread mode function is again a sign that re-entrancy is occurring.

Hence, either way such re-entrancy checks may prevent incorrect processing results being caused by a sequence of transitions which leads to secure code being called in the secure thread mode following an earlier call the same function which was interrupted and not yet resumed.

Such re-entrancy checks do not always need to be performed for the secure gateway instruction executed following a call from a less secure domain. As shown in FIG. 3 the re-entrancy enable configuration bit 36 may be provided in the configuration register 34 to control whether or not re-entrancy checks are required on a transition from the less secure domain to the secure gateway instruction at an address associated with the secure domain. For example if it is known that secure functions have code which is safe against re-entrancy then the re-entrancy checks can be disabled to improve performance and save power. However, even if the re-entrancy checks are disabled, the secure gateway instruction may still trigger the processing circuitry to issue a load request to the target address corresponding to the selected stack pointer, or issue another type of request which triggers permissions checking for the target address, because this still protects against some types of attack involving manipulation of stack pointers as discussed above.

Figure 10:
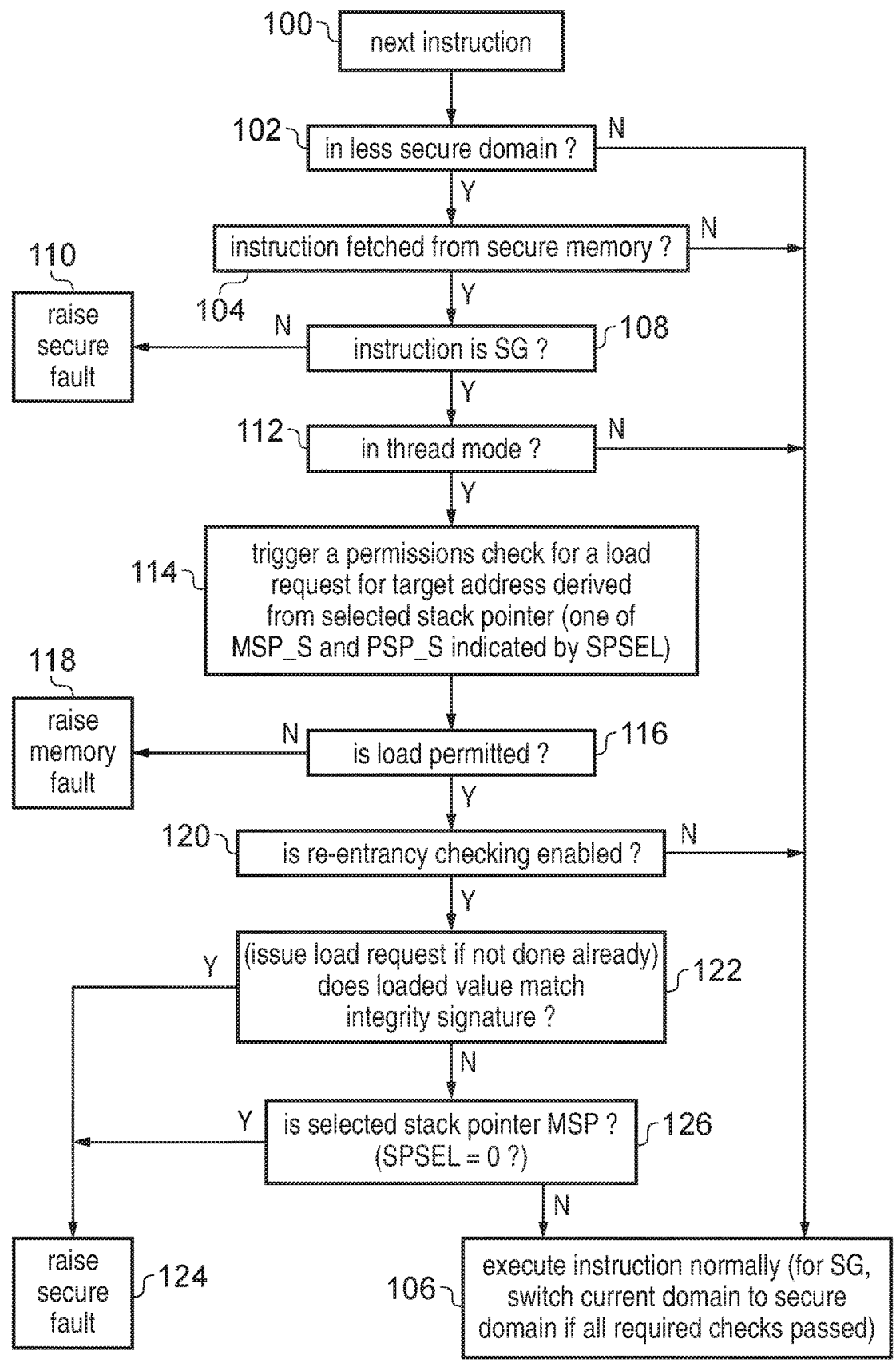
FIG. 10 shows a method of data processing including triggering a stack pointer verifying action in response to a gateway instruction.

FIG. 10 shows a flow diagram illustrating a method of performing data processing using the processing apparatus 2 shown in FIG. 1, including the checks performed in response to the secure gateway instruction. At step 100 the next instruction to be processed is obtained. At step 102, it is detected whether the current domain is the less secure domain and at step 104 it is detected whether the next instruction was fetched from region of memory marked by the attribute data in the SAU 24 as being associated with the secure domain. In general, on a transition from the less secure domain to an instruction fetched from a secure region of memory, certain checks may be required to check whether the entry into the secure domain is valid. The case when the current domain is the less secure domain and the next instruction is fetched from secure memory is referred to as a given change of control flow. If either the current domain is the secure domain or the instruction was fetched from a less secure region of memory, then this is not the given change of control flow and the subsequent security/re-entrancy checks are not required. If the current domain is the secure domain or the instruction is fetched from less secure memory, at step 106 the next instruction can be executed as normal according to whatever function is represented by that instruction.

If the given change of control flow, from the less secure domain to an instruction fetched from secure memory, is identified, then at step 108 the processing circuitry 4 checks whether the next instruction is the secure gateway (SG) instruction. If the next instruction is any instruction other than the secure gateway instruction then at step 110 a secure fault is raised. This ensures that the system can only transition to the secure domain at certain points at the code marked by the secure gateway instruction.

If the instruction is identified as a secure gateway instruction then at step 112 the processing circuitry 4 determines whether the current mode of operation is the thread mode. If the current mode is handler mode, then the subsequent checks for re-entrancy and the stack pointer verification may be omitted and at step 106 the instruction may be executed normally. For the secure gateway instruction such normal execution could include at least one security check for checking whether the transition into the secure domain is allowed. If all required security checks are passed for the secure gateway instruction then execution of the secure gateway instruction causes the processing circuitry 4 to update a register which specifies the current security domain of operation, so that the current domain is switched from the less secure domain to the secure domain.

Note that it is possible that the secure gateway instruction could also be encountered in cases where the current domain is the secure domain. This may be because the same code may be called either from a less secure function or from the secure function. In cases where the secure gateway instruction is executed when already in the secure domain, then the program flow would proceed from step 102 to step 106 as discussed above.

If at step 112 the current mode is determined to be the thread mode, then at step 114 in response to the secure gateway instruction the processing circuitry 4 triggers the memory access checking circuitry 22 to perform a permissions check to determine whether a load request, which requests loading of data from memory 6 at a target address derived from the selected stack pointer which is indicated by the stack pointer selection value 30 as being used for the secure thread mode, would be permitted. In particular, the target address may be equal to the stack pointer stored in the selected register MSP_S or PSP_S which is selected depending on the stack pointer selection value 30. The triggering of the permissions check causes the MPU 26 to check the target address against access permissions. The MPU 26 may maintain separate sets of memory attribute entries for the secure and less secure domains respectively. For the secure gateway instruction, although the current domain may still be the less secure domain, the load request may be checked against the access permissions associated with the secure domain. Also, whether or not the load triggered by the secure gateway instruction is considered a privileged access request or an unprivileged access request may depend on the privilege control value 31 shown in FIG. 3 which specifies whether accesses from secure thread mode should be treated as privileged or unprivileged.

The permissions check at step 114 could be triggered in a number of different ways. In one example, the processing circuitry 4 may actually issue a load request specifying the target address, similar to if an actual load operation was being performed. Alternatively, a different type of request could be issued to the memory access checking circuitry 22, e.g. a store request or an address checking request which triggers a permissions check without triggering an actual memory access to the memory system 6. In cases when the re-entrancy checking is performed, it may be most efficient to issue a load request (as the value loaded by such a load request will be needed at step 122), but when re-entrancy checking is not performed, another type of request could be used. Alternatively even if re-entrancy checking is disabled a load request may still be issued to invoke the memory access permissions check, to reduce complexity by enabling the same type of request to be issued regardless of whether re-entrancy checking is enabled or disabled.

Hence at step 116 based on the look up of the memory access permissions by the MPU 26, the memory access checking circuitry 22 determines whether a load to the target address would be permitted and if not then at step 118 a memory protection fault is raised. Hence, if the secure thread mode is treated as unprivileged and the address associated with the selected stack pointer points to privileged memory (which would generally be expected if the main stack pointer is currently selected) then the load may not be permitted and the memory fault may prevent the subsequent secure code manipulating the main stack pointer value in a way that could be inappropriate or lead to security vulnerabilities.

If the permissions check passes (a load to the target address would be permitted) then at step 120 the processing circuitry detects whether the re-entrancy enable configuration value 36 indicates that re-entrancy checking is enabled. If re-entrancy checking is disabled then the method proceeds to step 106 to execute the SG instruction normally as described above. Note that even if re-entrancy checking is disabled the permissions check at step 116 is still triggered to provide protection against the stack manipulation attacks.

If re-entrancy checking is enabled then the method proceeds to step 122, If a load request was not already issued at step 114, a load request specifying the target address can be issued at step 122 (although in practice, in cases when re-entrancy checking is enabled, it can be more efficient to issue a load request at step 114 to trigger the permissions check). Regardless of whether the load request is issued at step 114 or step 122, at step 122 the processing circuitry 4 detects whether the value loaded from memory 6 in response to the load request to the target address matches the integrity signature 50 which would be saved on the stack when the additional state saving of the callee state is performed as shown in FIG. 5, If the loaded value matches the integrity signature, then there is a re-entrancy scenario and so at step 124 a secure fault is raised to prevent incorrect processing results being caused by executing the second instance of the secure function when the first instance was not yet complete.

Also, if re-entrancy checking is enabled, at step 126 the processing circuitry checks whether the stack point selection value 30 indicates that the currently selected state pointer is main stack pointer, i.e. whether the stack pointer selection value equals 0 in this example. If the currently selected stack pointer is the main stack pointer then again at step 124 the secure fault is raised. If the value loaded does not match the integrity signature and the currently selected stack pointer is the process stack pointer (stack pointer selection value equals 1) then at step 106 the SG instruction is executed normally because the re-entrancy checks have passed.

Hence, in summary by using the secure gateway instruction to trigger verification of the stack pointer value and re-entrancy checks when enabled, this can provide protection against attacks as well as improving performance by avoiding the need for software detection or mitigation against re-entrancy scenarios.

Figure 11:
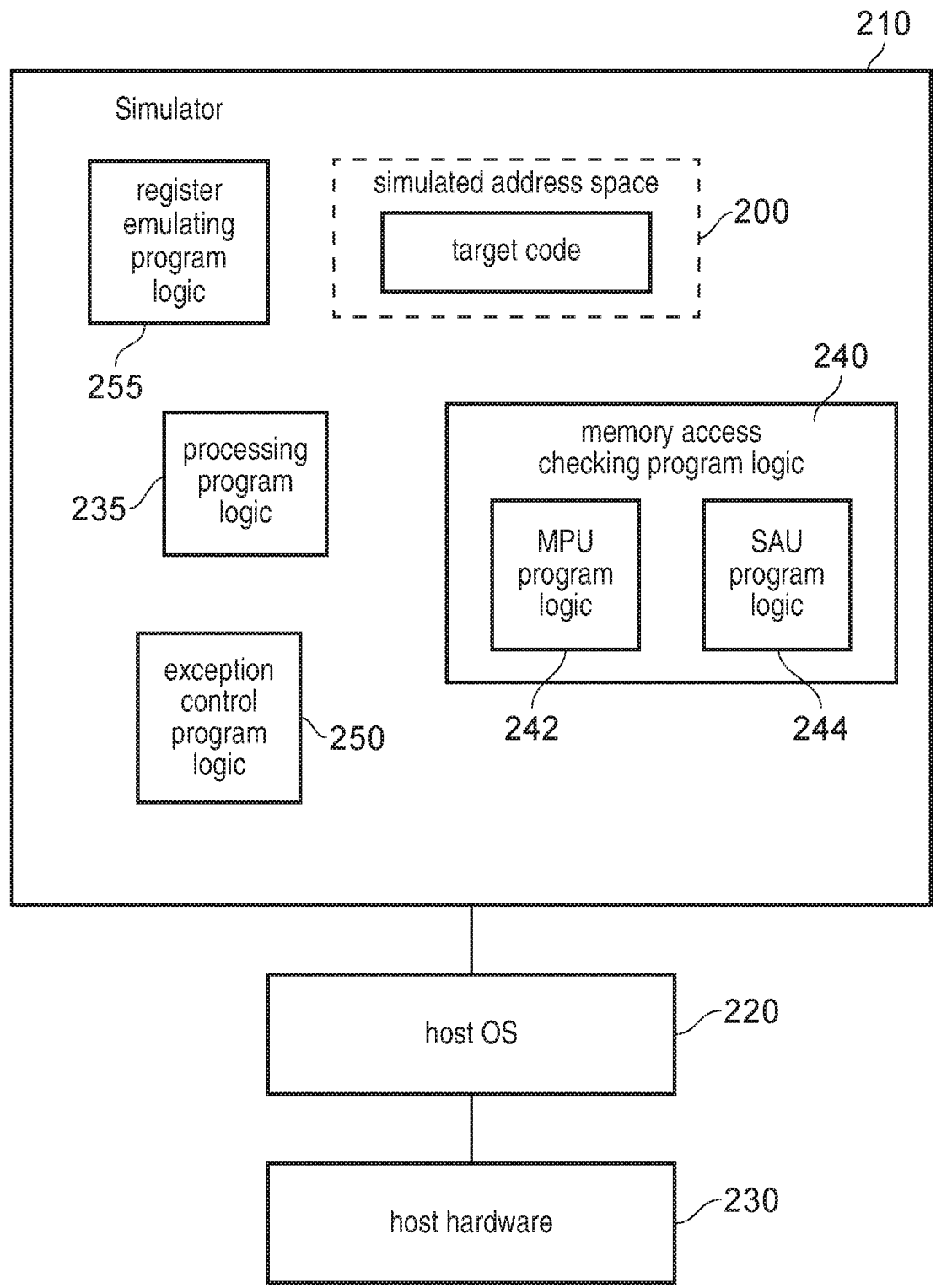
FIG. 11 shows a simulator example that can be used.

FIG. 11 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. Also, the physical address space used to access memory 6 in the hardware apparatus 2 could be emulated as a simulated address space 200 which is mapped onto the virtual address space used by the host operating system 220 by the simulator 210. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code (which may include applications, operating systems and a hypervisor) which is the same as the application program interface of the hardware architecture being modelled by the simulator program 210. Thus, the program instructions of the target code may be executed from within the instruction execution environment using the simulator program 210, so that a host computer 230 which does not actually have the hardware features of the apparatus 2 discussed above can emulate these features. The simulator program may include processing program logic 235, memory access checking program logic 240 (including MPU program logic 242 and SAU program logic 244) and exception control program logic which provide functionality which emulates the behaviour of the processing pipeline 4, memory access checking circuitry 22 (including MPU 26 and SAU 24) and exception control circuitry 28 of the hardware apparatus 2 of FIG. 1. The architectural registers 14 of the system 2 may also be emulated using a register emulating program logic 255 maintained by the simulator code 210, for mapping the architectural registers of a target architecture onto the memory space used by the host hardware 230. Hence, the security checks and re-entrancy checking triggered by the gateway instruction in hardware in the examples discussed above can in the example of FIG. 11 instead by performed in software by the simulator program 210 when the secure gateway instruction is identified within the target code 200 following the given change of program flow in the processing of the target code 200.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   processing circuitry to perform data processing in one of a plurality of security domains including at least a secure domain and a less secure domain;
   memory access checking circuitry to check whether a memory access is allowed depending on security attribute data indicative of which of the plurality of security domains is associated with a target address of the memory access; and
   at least one stack pointer register to store a stack pointer indicative of a stack data structure in memory; in which:
   in response to a given change of program flow from processing in the less secure domain to a target instruction having an instruction address associated with the secure domain:
     when the target instruction is an instruction other than a gateway instruction indicative of a valid entry point to the secure domain, the processing circuitry configured to trigger a fault; and
     when the target instruction is said gateway instruction, the processing circuitry is configured to trigger a stack pointer verifying action to verify whether it is safe to use a selected stack pointer stored in a selected stack pointer register;
   in response to said given change of program flow, when the target instruction is the gateway instruction, the processing circuitry is configured to perform re-entrancy checking in response to the gateway instruction;
   the re-entrancy checking comprising triggering a fault when a value loaded from an address derived from the selected stack pointer is at least one integrity signature value.

2. The apparatus according to claim 1, in which said stack pointer verifying action comprises triggering a permissions check to check whether a load request, which requests loading of a value from the address derived from the selected stack pointer stored in the selected stack pointer register, would be permitted.

3. The apparatus according to claim 2, in which the processing circuitry is configured to operate at one of a plurality of privilege levels; and
the memory access checking circuitry is configured to trigger a fault if a selected set of access permissions applicable to the target address specify that a selected privilege level is prohibited from accessing the target address.

4. The apparatus according to claim 3, in which:
the processing circuitry is configured to perform data processing in one of a plurality of modes of operation; and
said selected privilege level comprises a privilege level associated with processing in a combination of the secure domain and a current mode of operation of the processing circuitry at a time of said given change of program flow.

5. The apparatus according to claim 3, in which said selected set of access permissions comprises a set of access permissions applicable to the target address when a current domain of the processing circuitry is the secure domain.

6. The apparatus according to claim 2, in which said target address equals the selected stack pointer.

7. The apparatus according to claim 1, in which in response to said given change of program flow, when the target instruction is the gateway instruction:
the processing circuitry is configured to determine whether or not to perform the re-entrancy checking in response to the gateway instruction based on a re-entrancy checking enable value specifying whether the re-entrancy checking is enabled or disabled.

8. The apparatus according to claim 1, in which in response to said given change of program flow, when the target instruction is the gateway instruction:
the processing circuitry is configured to trigger said permissions check for the address derived from the selected stack pointer even when the re-entrancy checking enable value specifies that re-entrancy checking is disabled.

9. The apparatus according to claim 1, comprising exception control circuitry responsive to an exception condition to perform one of a plurality of exception entry transitions selected based at least on a current security domain of the processing circuitry, where for at least a subset of the plurality of exception entry transitions, the exception control circuitry is configured to trigger saving of a stack frame including said integrity signature value to a stack data structure identified by the stack pointer stored in said at least one stack pointer register.

10. The apparatus according to claim 1, comprising exception control circuitry responsive to an exception return condition to perform one of a plurality of exception return transitions selected based at least on a security domain associated with the exception return condition, where for at least a subset of the plurality of exception return transitions, the exception control circuitry is configured to perform integrity signature checking comprising accessing a stack frame from a given stack data structure selected for that exception return transition and triggering a fault when a mismatch is detected between the value at a predetermined position in the accessed stack frame and said at integrity signature value.

11. The apparatus according to claim 1, in which the re-entrancy checking also comprises triggering a fault when a stack pointer selection value, for determining which stack pointer register to use for stacking or unstacking architectural state, has a predetermined value.

12. The apparatus according to claim 11, in which:
within a given security domain, the processing circuitry is configured to perform data processing in one of a plurality of modes, including a handler mode for exception processing and a thread mode for background processing;
the apparatus comprises exception control circuitry responsive to an exception condition to trigger storage of architectural state data to:
a process stack data structure identified by a stack pointer stored in a process stack pointer register when the exception condition occurs in the thread mode and the stack pointer selection value has a first value; and
a main stack data structure identified by a stack pointer stored in a main stack pointer register when the exception condition occurs in the thread mode and the stack pointer selection value has a second value; and
said predetermined value comprises the second value.

13. The apparatus according to claim 12, in which in response to at least one secure thread mode to secure handler mode exception entry transition, the exception control circuitry is configured to update the stack pointer selection value to the second value.

14. The apparatus according to claim 1, in which in response to a change of program flow from processing in the secure domain to a gateway instruction having an instruction address associated with the secure domain, the processing circuitry is configured to omit the re-entrancy checking.

15. The apparatus according to claim 1, in which within a given security domain, the processing circuitry is configured to perform data processing in one of a plurality of modes, including a handler mode for exception processing and a thread mode for background processing;
the apparatus comprises exception control circuitry responsive to an exception condition to trigger storage of architectural state data to:
a process stack data structure identified by a stack pointer stored in a process stack pointer register when the exception condition occurs in the thread mode and a stack pointer selection value has a first value; and
a main stack data structure identified by a stack pointer stored in a main stack pointer register when the exception condition occurs in the thread mode and the stack pointer selection value has a second value; and
said stack pointer verifying action comprises triggering a fault when the stack pointer selection value has the second value.

16. The apparatus according to claim 1, in which in response to said given change of program flow, when the target instruction is the gateway instruction and at least one security check performed in response to the gateway instruction is passed, the processing circuitry is configured to trigger a switch of a current security domain from the less secure domain to the secure domain.

17. The apparatus according to claim 1, in which:
in response to said given change of control flow, when the target instruction is said gateway instruction, the processing circuitry is configured to trigger said stack pointer verifying action at least when said processing circuitry is in a predetermined mode of operation.

18. The apparatus according to claim 17, in which within a given security domain, the processing circuitry is configured to perform data processing in one of a plurality of modes, including a handler mode for exception processing and a thread mode for background processing; and
said predetermined mode of operation comprises the thread mode.

19. The apparatus according to claim 17, in response to said given change of control flow, when the target instruction is said gateway instruction, the processing circuitry is configured to omit said stack pointer verifying action when said processing circuitry is in a mode of operation other than said predetermined mode of operation.

20. A data processing method for processing circuitry capable of performing data processing in one of a plurality of security domains including at least a secure domain and a less secure domain, for which checking of whether a memory access is allowed is dependent on security attribute data indicative of which of the plurality of security domains is associated with a target address of the memory access, the method comprising:
in response to a given change of program flow from processing in the less secure domain to a target instruction having an instruction address associated with the secure domain:
determining whether the target instruction is a gateway instruction indicative of a valid entry point to the secure domain;
in response to the target instruction being an instruction other than said gateway instruction, triggering a fault; and
in response to said given change of program flow and the target instruction being said gateway instruction, triggering a stack pointer verifying action to verify whether it is safe to use a selected stack pointer stored in a selected stack pointer register and performing re-entrancy checking in response to the gateway instruction,
the re-entrancy checking comprising triggering a fault in response to a value loaded from an address derived from the selected stack pointer being at least one integrity signature value.

21. A non-transitory computer-readable storage medium storing a computer program for controlling a host data processing apparatus to provide an instruction execution environment for execution of instructions; the computer program comprising:
processing program logic to support data processing in one of a plurality of security domains including at least a secure domain and a less secure domain;
memory access checking program logic to check whether a memory access is allowed depending on security attribute data indicative of which of the plurality of security domains is associated with a target address of the memory access; and
register emulating program logic to control access to a memory of the host data processing apparatus to simulate accesses to simulated architectural registers of a target architecture simulated by the computer program, said simulated architectural registers comprising at least one stack pointer register for storing a stack pointer indicative of a stack data structure in memory; in which:
in response to a given change of program flow from processing in the less secure domain to a target instruction having an instruction address associated with the secure domain:
when the target instruction is an instruction other than a gateway instruction indicative of a valid entry point to the secure domain, the processing program logic is configured to trigger a fault; and
when the target instruction is said gateway instruction, the processing program logic is configured to trigger a stack pointer verifying action to verify whether it is safe to use a selected stack pointer associated with a selected stack pointer register of said simulated architectural registers; and
in response to said given change of program flow, when the target instruction is the gateway instruction, the processing circuitry is configured to perform re-entrancy checking in response to the gateway instruction,
the re-entrancy checking comprising triggering a fault when a value loaded from an address derived from the selected stack pointer is at least one integrity signature value.

* * * * *